United States Patent
Yashiro et al.

(10) Patent No.: US 10,429,710 B2
(45) Date of Patent: Oct. 1, 2019

(54) ELECTROCHROMIC DEVICE

(71) Applicants: Tohru Yashiro, Kanagawa (JP); Yoshinori Okada, Kanagawa (JP); Keigo Takauji, Kanagawa (JP); Satoshi Yamamoto, Kanagawa (JP); Daisuke Goto, Kanagawa (JP); Toshiya Sagisaka, Kanagawa (JP); Masato Shinoda, Kanagawa (JP)

(72) Inventors: Tohru Yashiro, Kanagawa (JP); Yoshinori Okada, Kanagawa (JP); Keigo Takauji, Kanagawa (JP); Satoshi Yamamoto, Kanagawa (JP); Daisuke Goto, Kanagawa (JP); Toshiya Sagisaka, Kanagawa (JP); Masato Shinoda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 115 days.

(21) Appl. No.: 15/585,207

(22) Filed: May 3, 2017

(65) Prior Publication Data

US 2017/0329199 A1    Nov. 16, 2017

(30) Foreign Application Priority Data

May 13, 2016 (JP) .................................. 2016-097305
Jan. 26, 2017 (JP) .................................. 2017-012314
Apr. 12, 2017 (JP) .................................. 2017-078925

(51) Int. Cl.
| | |
|---|---|
| *G02F 1/1503* | (2019.01) |
| *G02F 1/155* | (2006.01) |
| *G02F 1/153* | (2006.01) |
| *C09K 9/02* | (2006.01) |
| *G02F 1/1516* | (2019.01) |

(52) U.S. Cl.
CPC ............. *G02F 1/1503* (2019.01); *C09K 9/02* (2013.01); *G02F 1/155* (2013.01); *G02F 1/1533* (2013.01); *C09K 2211/1048* (2013.01); *G02F 1/15165* (2019.01); *G02F 2001/1536* (2013.01); *G02F 2203/11* (2013.01)

(58) Field of Classification Search
USPC ................................................. 359/260–280
See application file for complete search history.

(56) References Cited

U.S. PATENT DOCUMENTS

| | | | |
|---|---|---|---|
| 2009/0231663 A1 | 9/2009 | Hirano et al. | |
| 2011/0222139 A1 | 9/2011 | Naijo et al. | |
| 2011/0279884 A1 | 11/2011 | Fujimura et al. | |
| 2012/0033286 A1 | 2/2012 | Yashiro et al. | |
| 2012/0050838 A1 | 3/2012 | Hirano et al. | |
| 2012/0154892 A1 | 6/2012 | Yashiro et al. | |
| 2012/0194894 A1 | 8/2012 | Yashiro et al. | |
| 2013/0258439 A1 | 10/2013 | Naijo et al. | |
| 2013/0335802 A1 | 12/2013 | Kim et al. | |
| 2014/0078569 A1 | 3/2014 | Takahashi et al. | |
| 2014/0268284 A1 | 9/2014 | Naijo et al. | |
| 2015/0168796 A1 | 6/2015 | Yashiro et al. | |
| 2015/0198857 A1 | 7/2015 | Yashiro et al. | |
| 2015/0274761 A1 | 10/2015 | Sagisaka et al. | |
| 2015/0331295 A1 | 11/2015 | Takahashi et al. | |
| 2015/0378233 A1 | 12/2015 | Fujimura et al. | |
| 2016/0005375 A1 | 1/2016 | Naijo et al. | |
| 2016/0108072 A1 | 4/2016 | Inoue et al. | |
| 2016/0209721 A1 | 7/2016 | Matsumoto et al. | |
| 2017/0010514 A1 | 1/2017 | Yashiro et al. | |

FOREIGN PATENT DOCUMENTS

| | | | |
|---|---|---|---|
| JP | 62-156172 | | 7/1987 |
| JP | 62-290768 | | 12/1987 |
| JP | 2008-107587 | | 5/2008 |
| JP | 2014112183 | * | 6/2014 |
| JP | 2014-523000 | | 9/2014 |
| WO | WO2013/003548 A2 | | 1/2013 |

OTHER PUBLICATIONS

Lim et al.; synthesis of novel arylamine containing perfluorocyclobutane and its electrochromic properties; J. Mater. Chem., 2009, 19, 2380-2385 (Year: 2009).*
A. L. Dyer, et al., "Conjugated Electrochromic Polymers: Structure-Driven Colour and Processing Control" in *Electrochromic Materials and Devices*, edited by R. J. Mortimer, et al., 113-183. (Weinheim: Wiley-VCH Verlag GmbH & Co. KGaA, 2015).
U.S. Appl. No. 15/372,651, filed Dec. 8, 2016.
U.S. Appl. No. 15/375,824, filed Dec. 12, 2016.
U.S. Appl. No. 15/315,103, filed Nov. 30, 2016.
U.S. Appl. No. 15/502,367, filed Feb. 7, 2017.
U.S. Appl. No. 15/315,970, filed Dec. 2, 2016.

* cited by examiner

*Primary Examiner* — Monique R Peets
(74) *Attorney, Agent, or Firm* — Oblon, McClelland, Maier & Neustadt, L.L.P.

(57) ABSTRACT

An electrochromic device is provided including a first substrate, a first electrode on the first substrate, a second substrate, a second electrode on the second substrate facing the first electrode, an electrochromic layer in contact with the first electrode, an anti-deterioration layer in contact with the second electrode facing the first electrode, and an electrolyte layer in contact with both the electrochromic layer and the anti-deterioration layer. At least one of the first electrode and the second electrode includes $In_2O_3$, and has an infrared light transmittance of 70% or more at a wavelength of 1,500 nm. The electrochromic layer includes a triarylamine-containing radical polymerizable compound represented by a specific formula.

14 Claims, 7 Drawing Sheets

ELECTROCHROMIC DEVICE

CROSS-REFERENCE TO RELATED APPLICATIONS

This patent application is based on and claims priority pursuant to 35 U.S.C. § 119(a) to Japanese Patent Application Nos. 2016-097305, 2017-012314 and 2017-078925, filed on May 13, 2016, Jan. 26, 2017 and Apr. 12, 2017, respectively, in the Japan Patent Office, the entire disclosure of each of which is hereby incorporated by reference herein.

BACKGROUND

Technical Field

The present disclosure relates to an electrochromic device.

Description of the Related Art

Electrochromism is the phenomenon displayed by some materials of reversibly changing color as a redox reaction reversibly occurs in the materials in response to a voltage. Electrochromic apparatuses using electrochromism have been actively studied recently with expectation of various applications of electrochromism. Particularly, electrochromic electronic light control windows that can control the quantity of incoming sunlight have been put into practice as an expected energy-saving device.

An electrochromic device generally includes two plate-like electrodes, an electrochromic layer containing an electrochromic material formed on one of the electrodes, and an electrochromic layer that is ion-conducting. The two electrodes are bonded together with the electrochromic layer and the electrochromic layer sandwiched therebetween.

The electrochromic electronic light control window can save heating or cooling energy in the room by taking or blocking sunlight, respectively. The electrochromic electronic light control window can achieve a maximum effect of energy saving by controlling the quantity of incoming sunlight in response to the external temperature, season, and/or sunlight strength. However, conventional electrochromic electronic light control windows can mainly control sunlight within the visible range, and cannot sufficiently control light within the infrared range that becomes a heat ray. This is because the electrochromic device generally includes ITO (indium tin oxide), as a transparent electrode, that causes plasma reflection of light within the infrared range, thereby cutting infrared ray. Furthermore, no electrochromic material that can largely change infrared light transmittance has been found.

SUMMARY

In accordance with some embodiments of the present invention, an electrochromic device is provided. The electrochromic device includes a first substrate, a first electrode on the first substrate, a second substrate, a second electrode on the second substrate facing the first electrode, an electrochromic layer in contact with the first electrode, an anti-deterioration layer in contact with the second electrode facing the first electrode, and an electrolyte layer in contact with both the electrochromic layer and the anti-deterioration layer. At least one of the first electrode and the second electrode includes an oxide material including an indium oxide represented by $In_2O_3$, and has an infrared light transmittance of 70% or more at a wavelength of 1,500 nm. The electrochromic layer includes a triarylamine-containing radical polymerizable compound represented by the following formula (1):

$$A_n\text{-}B_m \qquad \text{Formula (1)}$$

where, when n is 2, m is 0, and when n is 1, m is 0 or 1; at least one of A and B has a radical polymerizable functional group; A is represented by the following formula (2), and at least one of $R_1$ to $R_{15}$ is bound to B; and B is represented by the following formula (3), and one of $R_{16}$ to $R_{21}$ is bound to A;

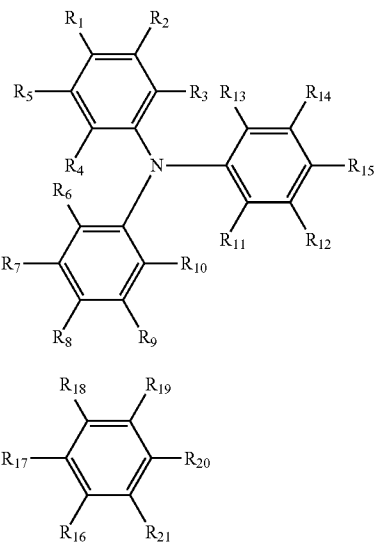

Formula (2)

Formula (3)

where each of $R_1$ to $R_{21}$ independently represents a monovalent organic group, and at least one of the monovalent organic groups is a radical polymerizable functional group.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
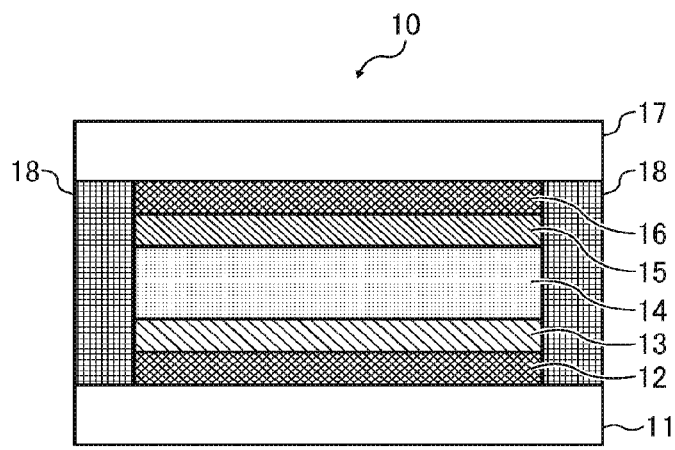
FIG. 1 is a schematic cross-sectional view of an electrochromic device according to a first embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

In accordance with some embodiments of the present invention, an electrochromic device is provided that can expresses a high infrared light transmittance and can undergo a large change in infrared light transmittance.

Electrochromic Device

An electrochromic device according to an embodiment of the present invention includes: a first substrate; a first electrode formed on the first substrate; a second substrate; a second electrode formed on the second substrate facing the first electrode; an electrochromic layer in contact with the first electrode; an anti-deterioration layer in contact with the second electrode facing the first electrode; and an electrolyte layer in contact with both the electrochromic layer and the anti-deterioration layer. At least one of the first electrode and the second electrode includes an oxide material including an indium oxide represented by $In_2O_3$, and has an infrared light transmittance of 70% or more at a wavelength of 1,500 nm. The electrochromic layer includes a triarylamine-containing radical polymerizable compound represented by the following formula (1):

$$A_n\text{-}B_m \qquad \text{Formula (1)}$$

In the formula (1), when n is 2, m is 0; and when n is 1, m is 0 or 1. At least one of A and B has a radical polymerizable functional group. A is represented by the following formula (2), and one of $R_1$ to $R_{15}$ is bound to B. B is represented by the following formula (3), and one of $R_{16}$ to $R_{21}$ is bound to A.

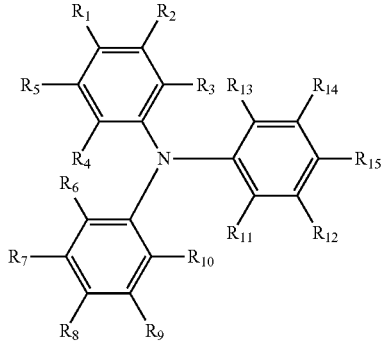

Formula (2)

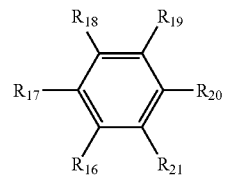

Formula (3)

In the formulae (2) and (3), each of $R_1$ to $R_{21}$ independently represents a monovalent organic group, and at least one of the monovalent organic groups is a radical polymerizable functional group.

The electrochromic device according to an embodiment of the present invention is achieved based on the following findings by the inventors. Firstly, the electrode used in the electrochromic element disclosed in JP-2008-107587-A, having a specific carrier density for suppressing the occurrence of plasmon reflection in the infrared range, has a higher electric resistance than a typical ITO electrode. It is difficult for such an electrode to give and receive charge needed for a redox reaction occurring in an electrochromic layer, thus making it difficult for the electrochromic element to develop or discharge color, or making the color development-discharge response speed of the electrochromic element slow. In particular, inorganic electrochromic materials, such as tungsten oxides, are known to express electrochromism in the infrared range. Such inorganic electrochromic materials are disadvantageous than organic electrochromic materials in terms of electric resistance of electrode, since they need a greater amount of charge in developing and discharging color.

Secondly, a conventional transparent carbon nanotube electrode used in the electrochromic device disclosed in JP-2014-523000-A cannot express a light transmittance comparable to that of ITO, under the electrode resistance condition required by the electrochromic device (e.g., the sheet resistance is 100Ω or less). This means that electrode resistance and transmittance do not go together, and therefore it is difficult for such an electrochromic device to express a sufficient transmittance of 60% or above.

Finally, a typical conductive polymer material having a molecular structure of polythiophene and/or polyaniline disclosed in a document A. L. DYER, et al., "Conjugated Electrochromic Polymers: Structure-Driven Colour and Processing Control" in *Electrochromic Materials and Devices*, edited by R. J. Mortimer, et al., 113-183, (Weinheim: Wiley-VCH Verlag GmbH & Co. KGaA, 2015) cannot be used as transparent glass because electrochromism is expressed between an infrared light absorbing state (reduction state) and a visible light absorbing state (oxidation state). Therefore, such a material can control transmittance of neither visible light having a transmittance of 60% or more nor infrared light.

In view of the above situation, an electrochromic device is demanded that can express a high infrared light transmittance and can undergo a large change in infrared light transmittance. In particular, an electrochromic device is strongly demanded that can express a high near-infrared light transmittance and can undergo a large change in near-infrared light transmittance, because it has been reported that near-infrared light (having a wavelength of from 750 to 1,500 nm) causes tingling sensation to the skin.

The inventors of the present invention have found that a triarylamine-containing radical polymerizable compound represented by the formula (1) provides excellent light control property in the infrared range. Specifically, the compound represented by the formula (1) expresses a high infrared light transmittance and undergoes a large charge in infrared light transmittance.

The triarylamine-containing radical polymerizable compound represented by the formula (1) is capable of performing a high-density light control that makes the absorbance (at a wavelength of 1,500 nm) 1.0 or less with just about 5 mC/cm² of electron injection. By combining with a transparent inorganic oxide electrode in which the carrier density has been adjusted to express a high infrared light transmittance, the triarylamine-containing radical polymerizable compound represented by the formula (1) can provide an electrochromic device having a high performance in the infrared range.

The triarylamine-containing radical polymerizable compound represented by the formula (1) expresses no light absorption in a visible wavelength range of from 450 to 1,000 nm when in a stable state. Thus, preferably, as a redox reaction occurs in the electrochromic layer, the electrochromic device transits from a transparent state in which a light transmittance within a wavelength range of from 450 to 1,000 nm is 60% or more to another state in which a light transmittance within a wavelength range of from 750 nm to 1,000 nm is smaller than that in the transparent state. In this case, the electrochromic device is preferably used as a transparent electrochromic light control window.

First Substrate and Second Substrate

The first substrate and the second substrate have a function of supporting the first electrode, the electrochromic layer, the electrolyte layer, the anti-deterioration layer, and the second electrode.

The substrates may be made of light transmissive materials (including organic and inorganic materials) capable of supporting the above layers.

Specific examples of the inorganic materials include, but are not limited to, glass substrates made of non-alkali-glass, borosilicate glass, float glass, or soda-lime glass.

Specific examples of the organic materials include, but are not limited to, resin substrates made of polycarbonate resin, acrylic resin, polyethylene, polyvinyl chloride, polyester, epoxy resin, melamine resin, phenol resin, polyurethane resin, or polyimide resin.

The substrates may have a surface coating such as a transparent insulating layer and/or an antireflection layer, for improving vapor barrier property, gas barrier property, and visibility.

First Electrode and Second Electrode

At least one of the first electrode and the second electrode contains an oxide material including an indium oxide ($In_2O_3$), and has an infrared light transmittance of 70% or more at a wavelength of 1,500 nm. Such an electrode serves as a conductive material expressing excellent transparency within the infrared wavelength range (from 750 to 1,500 nm) that enhances color contrast in combination with the transparent substrate.

The infrared light transmittance at a wavelength of 1,500 nm can be measured by, for example, a UV/Vis/NIR Spectrophotometer V-670 (product of JASCO Corporation) or a UV-Visible/NIR Spectrophotometer UH4150 (product of Hitachi High-Tech Science Corporation).

Examples of conventional ITO materials having excellent electric conductivity include a mixture of $In_2O_3$ and $SnO_2$ with the mass ratio ($In_2O_3/SnO_2$) of from 85/15 to 90/10. Depending on film crystallinity, carrier density of such materials is around $1.1 \times 10^{21}$ cm$^{-3}$, and therefore the infrared light transmittance at a wavelength of 1,500 nm is 50% or less due to the occurrence of plasma reflection.

In the present embodiment, the carrier density of the oxide material including the indium oxide ($In_2O_3$) is adjusted to $5 \times 10^{20}$ cm$^{-3}$ or less, so that the infrared light transmittance at a wavelength of 1,500 nm becomes 70% or more.

The carrier density of the oxide material can be adjusted to $5 \times 10^{20}$ cm$^{-3}$ or less by adjusting the mass ratio of $SnO_2$, the amount of oxygen, the type of added metals, and/or film crystallinity.

The carrier density is adjusted for the purpose of obtaining a transparent electrode having a high infrared transmittance. From the aspect of ease in adjustment and productivity, preferably, at least one of the first electrode and the second electrode includes an oxide material which contains 5% by mass or less of tin oxide ($SnO_2$) and 95% by mass or more of indium oxide ($In_2O_3$).

The first electrode and the second electrode may include additives, such as metals (e.g., Sn, Zr, Ga, Zn, Al, W, Zn, Ti) and oxides thereof.

The first electrode and the second electrode may be formed by sputtering or vapor deposition that can easily form a film having excellent transparency and electric conductivity. Crystallinity of the film can be controlled by controlling the temperature of the substrate on which the film is forming or by performing an annealing treatment after formation of the film.

In the case of being formed on glass substrates, the resulting films of the first electrode and the second electrode are given high crystallinity. In the case of being formed on plastic substrates (e.g., polycarbonate, polyethylene terephthalate), the films are unlikely to undergo a crystallization in their formation processes and the resulting films of the first electrode and the second electrode are given a high infrared light transmittance.

Crystallinity can be measured by an X-ray diffractometer (XRD). For example, when an electrode film having a thickness of about 110 nm is formed on a glass substrate by sputtering using a mixture of $In_2O_3/SnO_2$ (with a mass ratio of 9/1) as a sputtering target, and the electrode film is subjected to an X-ray diffraction measurement, preferably, no (440) plane peak is detected at around $2\theta \simeq 52$ (deg.), or alternatively, an intensity ratio (I440/I222) of a (440) plane peak detected at around $2\theta \simeq 52$ (deg.) to a main (222) plane peak detected at around $2\theta \simeq 32$ (deg.) is less than 0.14.

The thicknesses of the first electrode and the second electrode are so adjusted that these electrodes have proper electric resistance values required for causing a redox reaction in the electrochromic layer.

Preferably, the first electrode and the second electrode each have a thickness of from 20 to 500 nm, more preferably from 50 to 200 nm.

A network electrode of silver, gold, carbon nanotube, or a metal oxide, having transparency, and a composite layer thereof can also be used as the first and second electrodes. The network electrode is a transmissive electrode formed by a fine network of carbon nanotube or other highly-conductive non-transmissive materials.

In addition, a metal grid electrode having an adjusted aperture ratio (preferably 60% or more) and a composite layer thereof can also be used as the first and second electrodes.

Such a metal grid electrode may be made of Pt, Ag, Au, Cr, rhodium, or alloys or laminated bodies thereof.

The metal grid electrode can be formed by: a patterning on a metal layer by lithography; a vacuum film formation using a mask; a pattern printing with a metallic ink; or a plating on a patterned seed layer.

Each of these electrode materials may be used alone or in combination with a film of the oxide material including the indium oxide ($In_2O_3$), as at least one of the first and second electrodes.

Electrochromic Layer

The electrochromic layer includes a triarylamine-containing radical polymerizable compound.

The electrochromic layer formed by a polymerization of the triarylamine-containing radical polymerizable compound is advantageous in terms of repetitive driving (redox reaction) property and optical durability. Such an electrochromic layer is transparent in a color discharge state, and develops high-density color as an oxidation reaction occurs.

Preferably, the electrochromic layer includes a cross-linked product of an electrochromic composition including the triarylamine-containing radical polymerizable compound and another radical polymerizable compound, for more improving dissolution resistance and durability.

Examples of the triarylamine-containing radical polymerizable compounds include a compound represented by the formula (1), as described above.

Monovalent Organic Group

Specific examples of the monovalent organic group in the formulae (2) and (3) include, but are not limited to, a hydrogen atom, a halogen atom, hydroxyl group, nitro group, cyano group, carboxyl group, a substituted or unsubstituted alkoxycarbonyl group, a substituted or unsubstituted aryloxycarbonyl group, a substituted or unsubstituted alkylcarbonyl group, a substituted or unsubstituted arylcarbonyl group, amide group, a substituted or unsubstituted monoalkylaminocarbonyl group, a substituted or unsubstituted dialkylaminocarbonyl group, a substituted or unsubstituted monoarylaminocarbonyl group, a substituted or unsubstituted diarylaminocarbonyl group, sulfonic acid group, a substituted or unsubstituted alkoxysulfonyl group, a substituted or unsubstituted aryloxysulfonyl group, a substituted or unsubstituted alkylsulfonyl group, a substituted or unsubstituted arylsulfonyl group, sulfoneamide group, a substituted or unsubstituted monoalkylaminosulfonyl group, a substituted or unsubstituted dialkylaminosulfonyl group, a substituted or unsubstituted monoarylaminosulfonyl group, a substituted or unsubstituted diarylaminosulfonyl group, amino group, a substituted or unsubstituted monoalkylamino group, a substituted or unsubstituted dialkylamino group, a substituted or unsubstituted alkyl group, a substituted or unsubstituted alkenyl group, a substituted or unsubstituted alkynyl group, a substituted or unsubstituted aryl group, a substituted or unsubstituted alkoxy group, a substituted or unsubstituted aryloxy group, a substituted or unsubstituted alkylthio group, a substituted or unsubstituted arylthio group, and a substituted or unsubstituted heterocyclic group.

Among these groups, alkyl group, alkoxy group, hydrogen atom, aryl group, aryloxy group, halogen atom, alkenyl group, and alkynyl group are preferred, from the aspect of stable behavior.

Specific examples of the halogen atom include, but are not limited to, fluorine atom, chlorine atom, bromine atom, and iodine atom.

Specific examples of the alkyl group include, but are not limited to, methyl group, ethyl group, propyl group, and butyl group.

Specific examples of the aryl group include, but are not limited to, phenyl group and naphthyl group.

Specific examples of the aralkyl group include, but are not limited to, benzyl group, phenethyl group, and naphthylmethyl group.

Specific examples of the alkoxy group include, but are not limited to, methoxy group, ethoxy group, and propoxy group.

Specific examples of the aryloxy group include, but are not limited to, phenoxy group, 1-naphthyloxy group, 2-naphthyloxy group, 4-methoxyphenoxy group, and 4-methylphenoxy group.

Specific examples of the heterocyclic group include, but are not limited to, carbazole, dibenzofuran, dibenzothiophene, oxadiazole, and thiadiazole.

The substituent may be further substituted with a substituent, such as a halogen atom, nitro group, cyano group, an alkyl group (e.g., methyl group, ethyl group), an alkoxy group (e.g., methoxy group, ethoxy group), an aryloxy group (e.g., phenoxy group), an aryl group (e.g., phenyl group, naphthyl group), and an aralkyl group (e.g., benzyl group, phenethyl group).

Radical Polymerizable Functional Group

Here, the radical polymerizable functional group is defined as a radical polymerizable group having a carbon-carbon double bond.

Specific examples of the radical polymerizable functional group include, but are not limited to, 1-substituted ethylene functional groups and 1,1-substituted ethylene functional groups.

Specific examples of the 1-substituted ethylene functional groups include, but are not limited to, a functional group represented by the following formula (i).

   Formula (i)

In the formula (i), $X_1$ represents a substituted or unsubstituted arylene group, a substituted or unsubstituted alkenylene group, —CO— group, —COO— group, or —CON ($R_{100}$)— group (where $R_{100}$ represents a hydrogen atom, an alkyl group, an aralkyl group, or an aryl group), or —S— group.

Specific examples of the arylene group in the formula (i) include, but are not limited to, a substituted or unsubstituted phenylene group and naphthylene group.

Specific examples of the alkenylene group in the formula (i) include, but are not limited to, ethenylene group, propenylene group, and butenylene group.

Specific examples of the alkyl group in the formula (i) include, but are not limited to, methyl group and ethyl group.

Specific examples of the aralkyl group in the formula (i) include, but are not limited to, benzyl group, naphthylmethyl group, and phenethyl group.

Specific examples of the aryl group in the formula (i) include, but are not limited to, phenyl group and naphthyl group.

Specific examples of the radical polymerizable functional group represented by the formula (i) include, but are not limited to, vinyl group, styryl group, 2-methyl-1,3-butadienyl group, vinyl carbonyl group, acryloyloxy group, acryloylamide group, and vinyl thioether group.

Specific examples of the 1,1-substituted ethylene functional groups include, but are not limited to, a functional group represented by the following formula (ii).

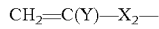
$CH_2=C(Y)-X_2-$  Formula (ii)

In the formula (ii), Y represents a substituted or unsubstituted alkyl group, a substituted or unsubstituted aralkyl group, a substituted or unsubstituted aryl group, a halogen atom, cyano group, nitro group, an alkoxy group, or —$COOR_{101}$ group (where $R_{101}$ represents a hydrogen atom, a substituted or unsubstituted alkyl group, a substituted or unsubstituted aralkyl group, a substituted or unsubstituted aryl group, or $CONR_{102}R_{103}$ (where each of $R_{102}$ and $R_{103}$ independently represents a hydrogen atom, a substituted or unsubstituted alkyl group, a substituted or unsubstituted aralkyl group, or a substituted or unsubstituted aryl group)). $X_2$ represents a substituent, such as those exemplified for $X_1$ in the formula (i), a single bond, or an alkylene group. At least one of Y and $X_2$ represents oxycarbonyl group, cyano group, an alkenylene group, or an aromatic ring.

Specific examples of the aryl group in the formula (ii) include, but are not limited to, phenyl group and naphthyl group.

Specific examples of the alkyl group in the formula (ii) include, but are not limited to, methyl group and ethyl group.

Specific examples of the alkoxy group in the formula (ii) include, but are not limited to, methoxy group and ethoxy group.

Specific examples of the aralkyl group in the formula (ii) include, but are not limited to, benzyl group, naphthylmethyl group, and phenethyl group.

Specific examples of the radical polymerizable functional group represented by the formula (ii) include, but are not limited to, α-acryloyloxy chloride group, methacryloyloxy group, α-cyanoethylene group, α-cyanoacryloyloxy group, α-cyanophenylene group, and methacryloyl amino group.

$X_1$, $X_2$, and Y may be further substituted with a substituent, such as a halogen atom, nitro group, cyano group, an alkyl group (e.g., methyl group, ethyl group), an alkoxy group (e.g., methoxy group, ethoxy group), an aryloxy group (e.g., phenoxy group), an aryl group (e.g., phenyl group, naphthyl group), and an aralkyl group (e.g., benzyl group, phenethyl group).

In particular, acryloyloxy group and methacryloyloxy group are preferred as the radical polymerizable functional group.

Specific preferred examples of the triarylamine-containing radical polymerizable compound include compounds represented by the following formulae (1-1) to (1-3). Among these compounds, a radical polymerizable compound represented by the formula (1-1) is preferable since it undergoes a large change in infrared light transmittance.

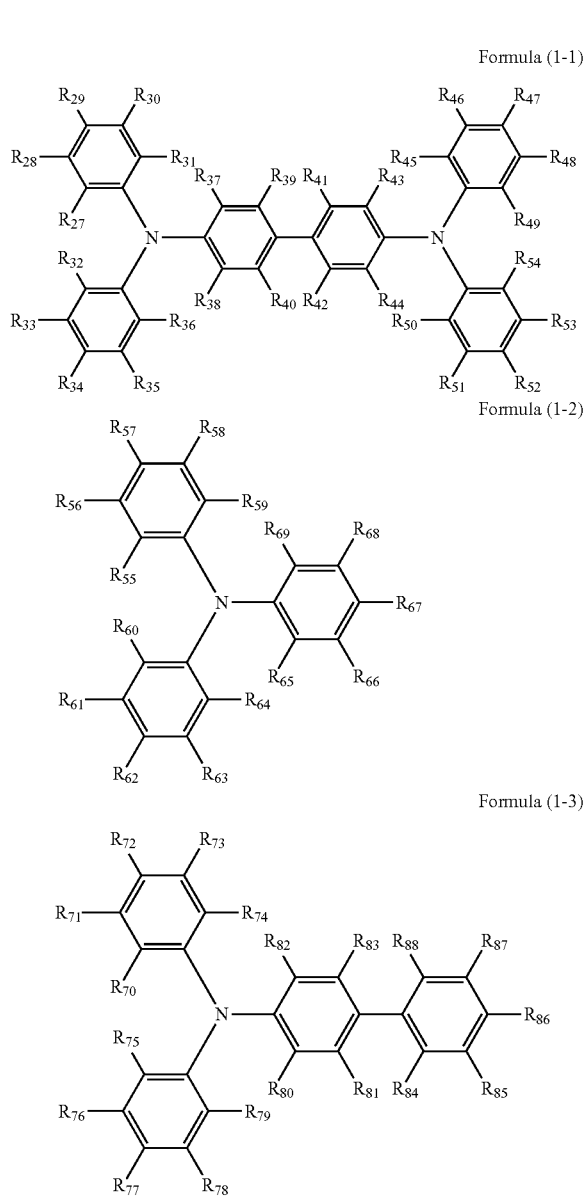

In the formulae (1-1) to (1-3), each of $R_{27}$ to $R_{88}$ independently represents a monovalent organic group, and at least one of the monovalent organic groups is a radical polymerizable functional group. $R_{39}$ and $R_{41}$ may share bond connectivity to from a ring. $R_{40}$ and $R_{42}$ may share bond connectivity to from a ring.

Specific examples of the ring include, but are not limited to, cycloalkanes having 5 to 6 carbon atoms which may have a substituent having 1 to 20 carbon atoms.

Specific examples of the monovalent organic group and the radical polymerizable functional group include those exemplified for the formula (2) and (3).

Specific examples of the triarylamine-containing radical polymerizable compounds represented by the formulae (1-1) to (1-3) include the following compounds, but are not limited thereto.
Example Compound 1
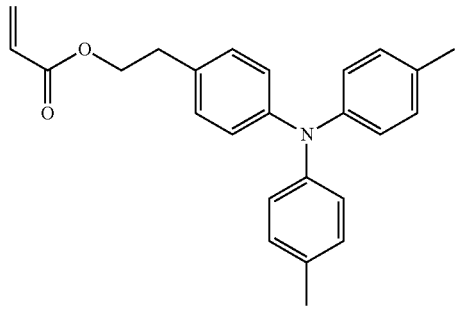
Example Compound 2
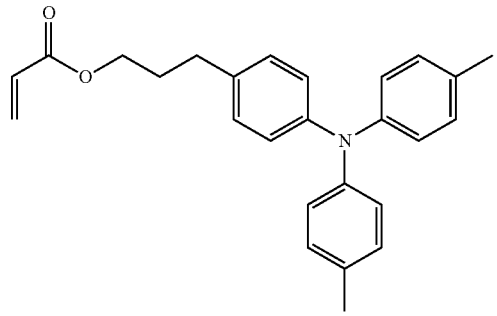
Example Compound 3
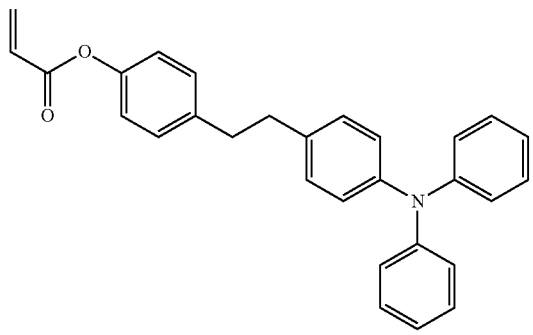
Example Compound 4
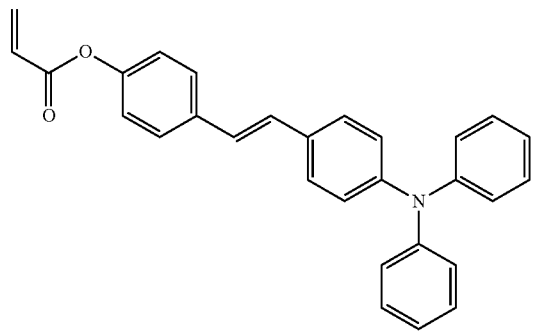
Example Compound 5
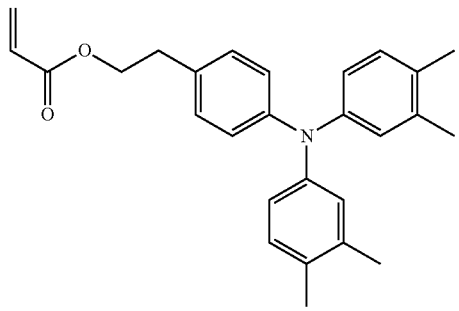
Example Compound 6
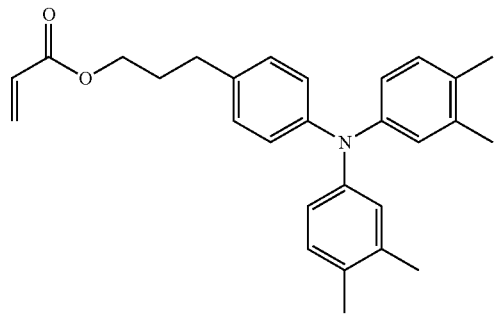
Example Compound 7
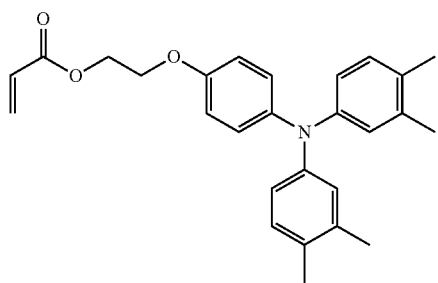
Example Compound 8
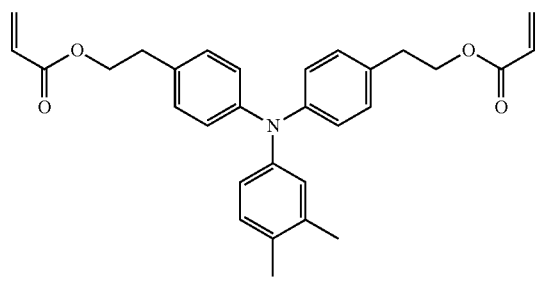

-continued
Example Compound 9
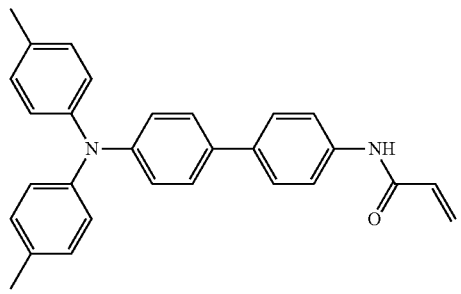
Example Compound 10
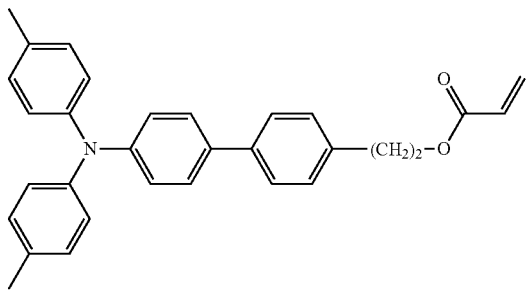
Example Compound 11
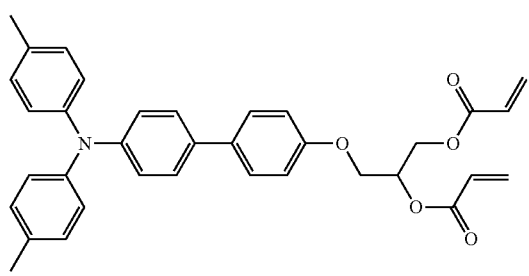
Example Compound 12
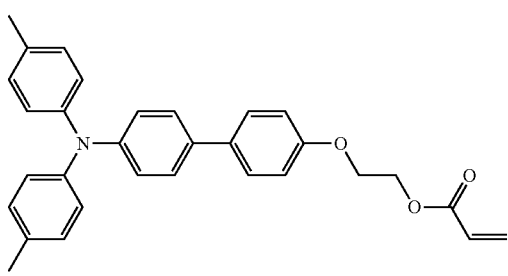
Example Compound 13
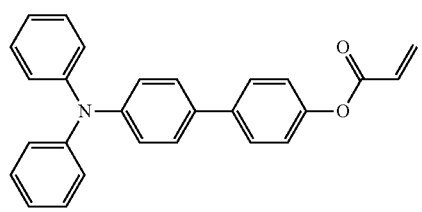
Example Compound 14
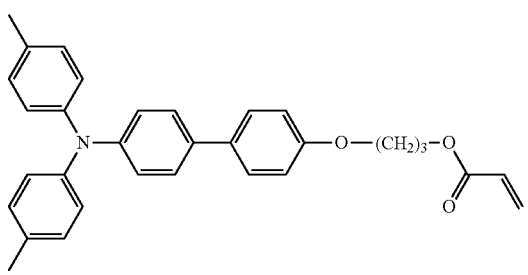
Example Compound 15
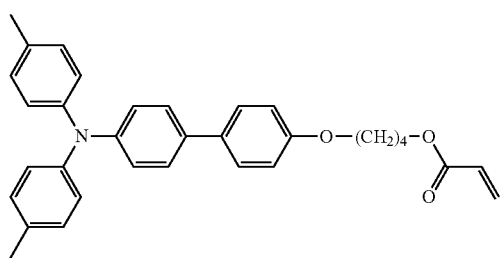
Example Compound 16
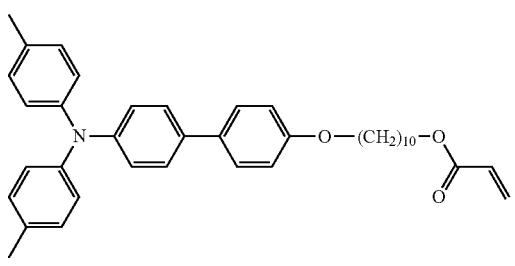
Example Compound 17
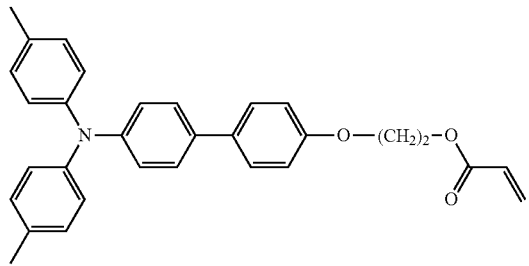
Example Compound 18
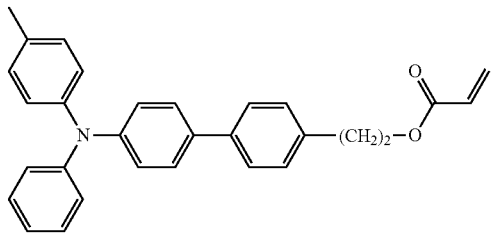

-continued
Example Compound 19
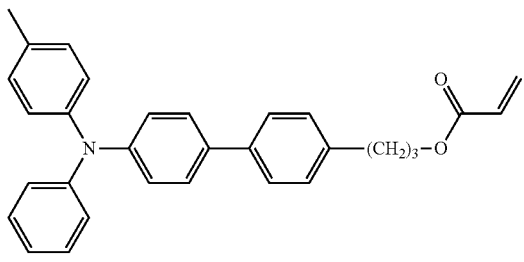
Example Compound 20
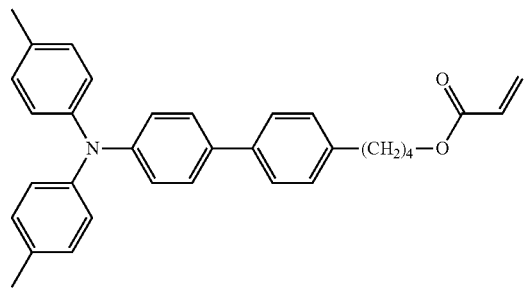
Example Compound 21
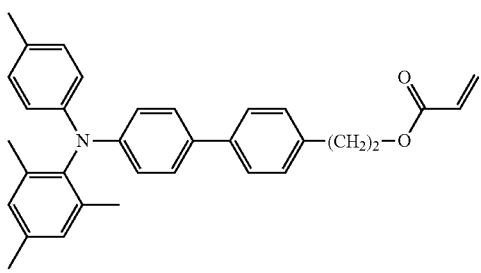
Example Compound 22
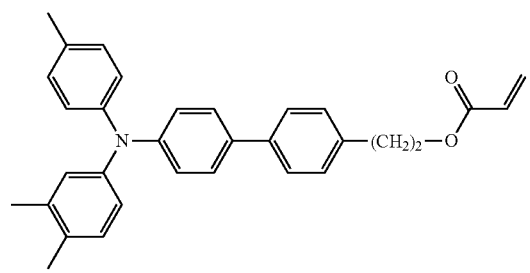
Example Compound 23
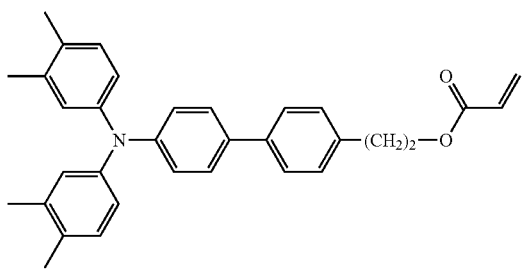
Example Compound 24
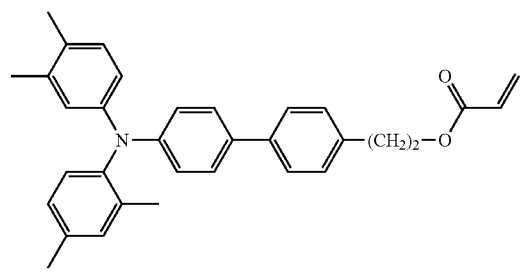
Example Compound 25
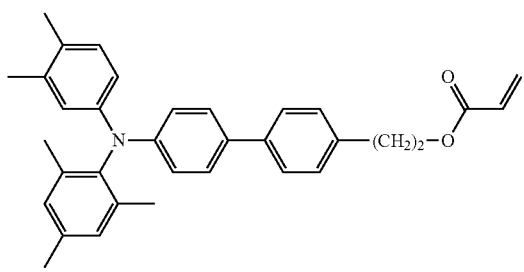
Example Compound 26
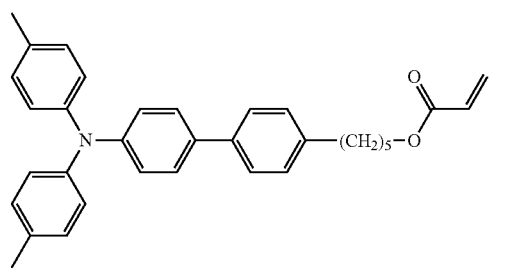
Example Compound 27
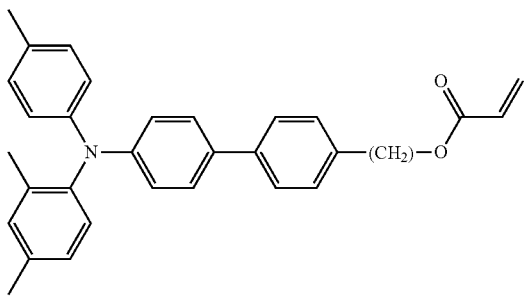
Example Compound 28
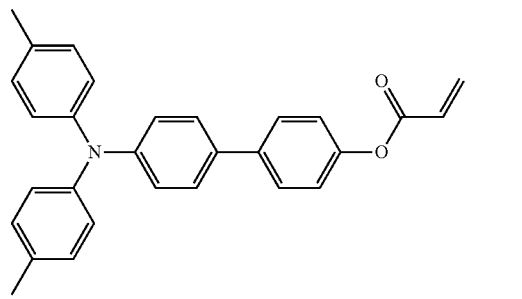

-continued
Example Compound 29
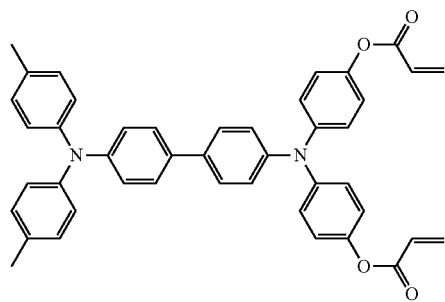
Example Compound 30
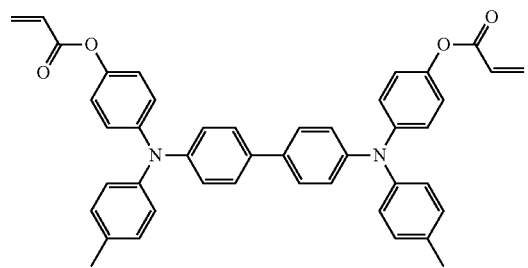
Example Compound 31
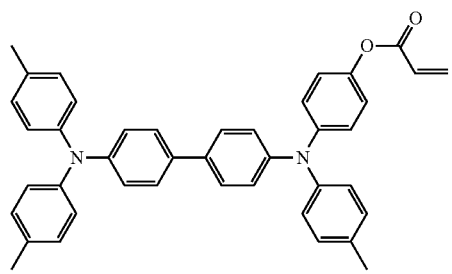
Example Compound 32
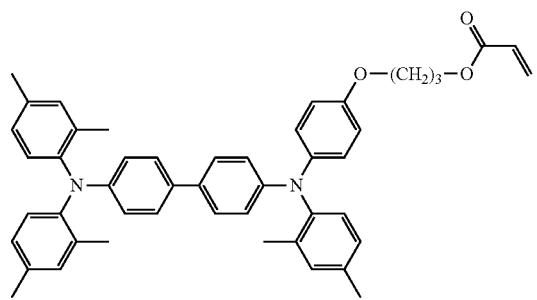
Example Compound 33
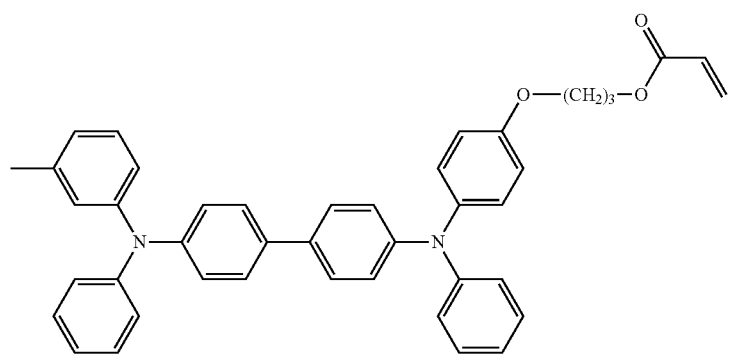
Example Compound 34
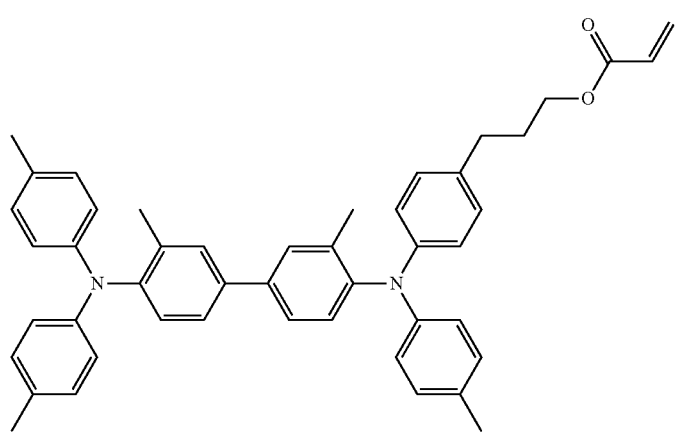

Example Compound 35
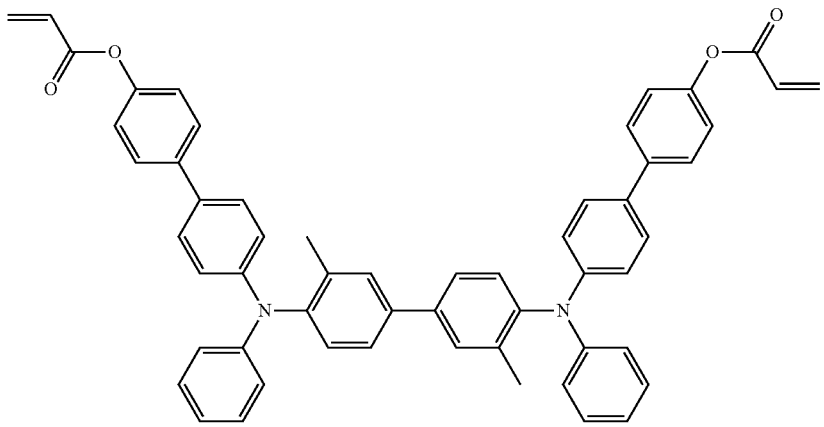
Example Compound 36
Example Compound 37
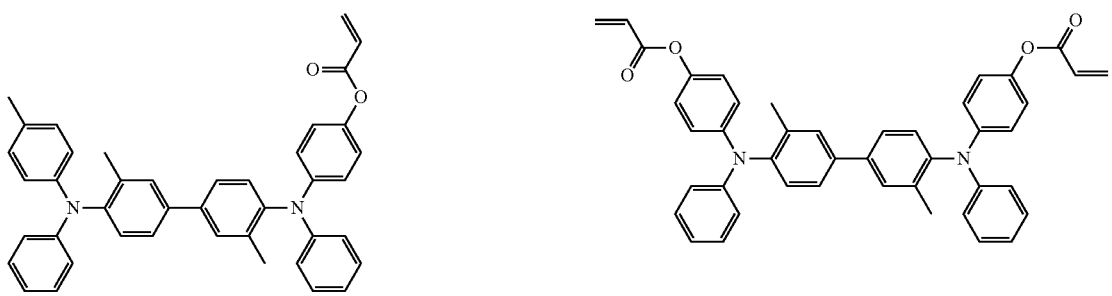
Example Compound 38
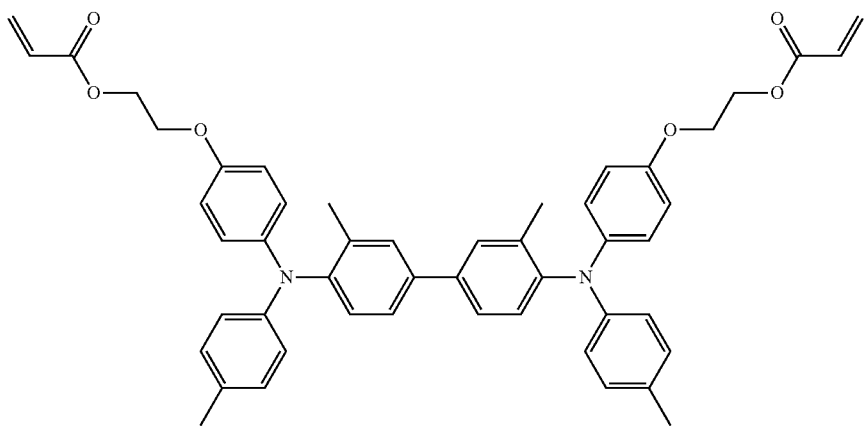
Example Compound 39
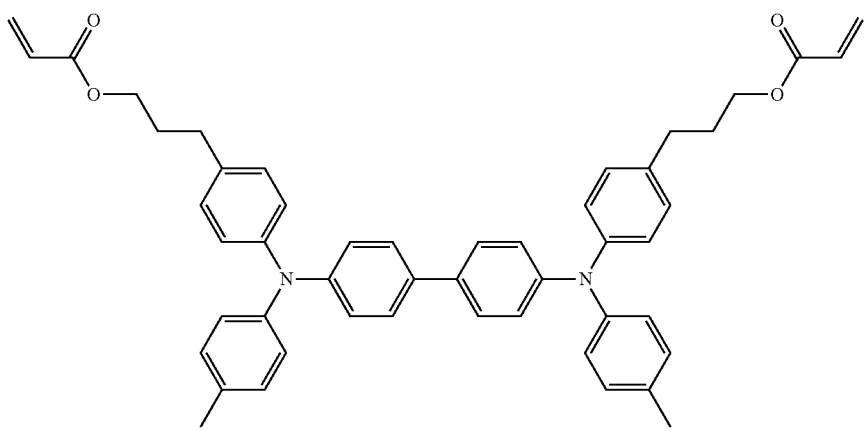

-continued
Example Compound 40
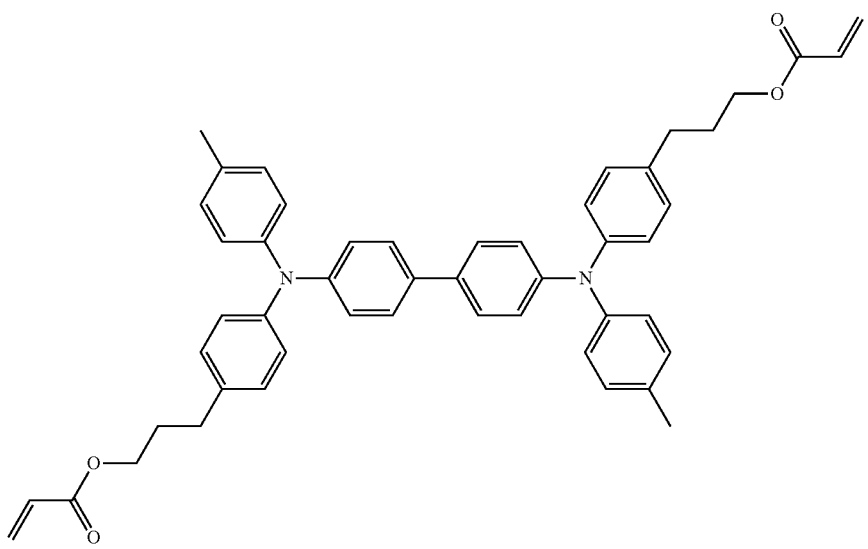
Example Compound 41
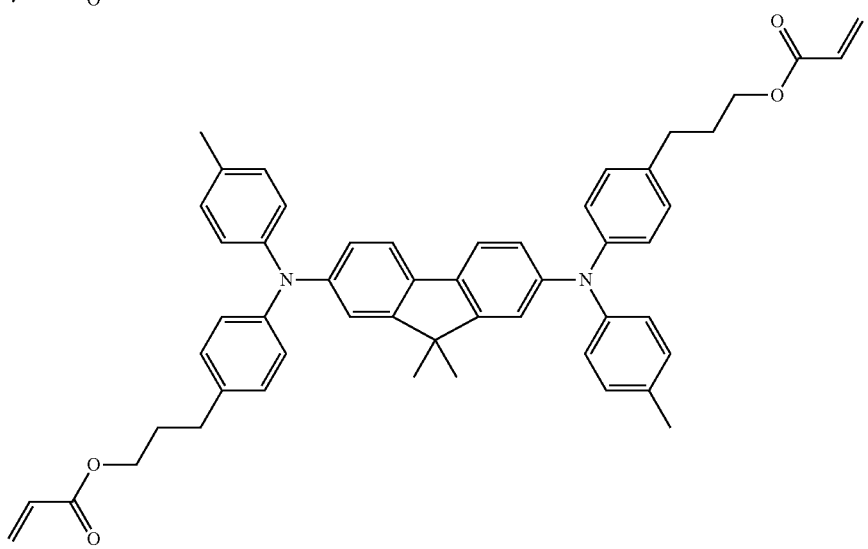
Example Compound 42
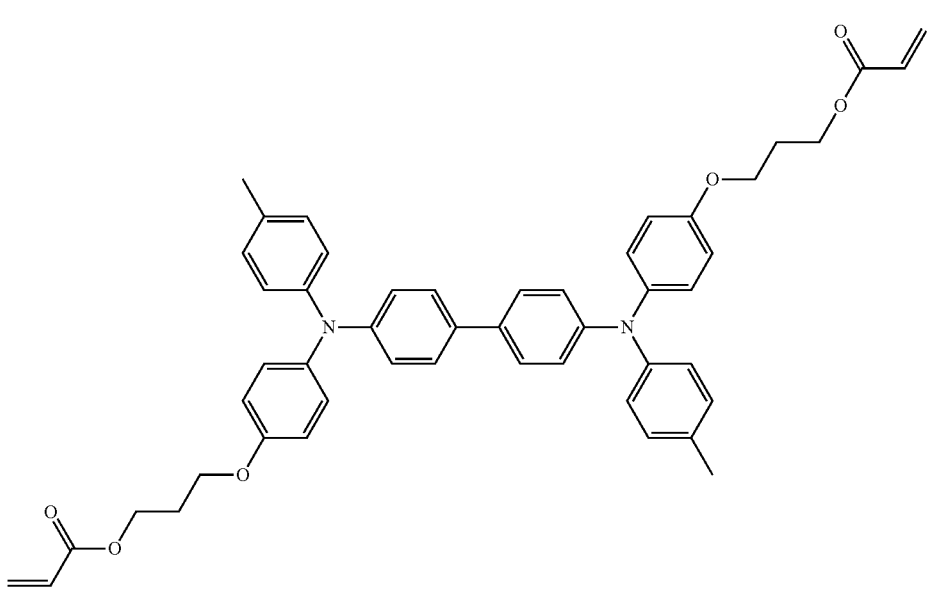

Electrochromic Composition

Preferably, the electrochromic composition includes the triarylamine-containing radical polymerizable compound, another radical polymerizable compound, and a polymerization initiator. The electrochromic composition may further include other components, if needed.

Another Radical Polymerizable Compound

The radical polymerizable compound other than the triarylamine-containing radical polymerizable compound (hereinafter "the other radical polymerizable compound") has at least one radical polymerizable functional group.

Specific examples of the other radical polymerizable compound include, but are not limited to, monofunctional, difunctional, tri- or more-functional radical polymerizable compounds, functional monomers, and radical polymerizable oligomers. Among these compounds, tri- or more-functional radical polymerizable compounds are preferable.

Examples of the radical polymerizable functional group included in the other radical polymerizable compound include those exemplified for the radical polymerizable functional group included in the triarylamine-containing radical polymerizable compound. In particular, acryloyloxy group and methacryloyloxy group are preferred as the radical polymerizable functional group.

Specific examples of the monofunctional radical polymerizable compounds include, but are not limited to, 2-(2-ethoxyethoxy)ethyl acrylate, methoxypolyethylene glycol monoacrylate, methoxypolyethylene glycol monomethacrylate, phenoxypolyethylene glycol acrylate, 2-acryloyloxyethyl succinate, 2-ethylhexyl acrylate, 2-hydroxyethyl acrylate, 2-hydroxypropyl acrylate, tetrahydrofurfuryl acrylate, 2-ethylhexylcarbitol acrylate, 3-methoxybutyl acrylate, benzyl acrylate, cyclohexyl acrylate, isoamyl acrylate, isobutyl acrylate, methoxytriethylene glycol acrylate, phenoxytetraethylene glycol acrylate, cetyl acrylate, isostearyl acrylate, stearyl acrylate, and styrene monomer. Each of these compounds can be used alone or in combination with others.

Specific examples of the difunctional radical polymerizable compounds include, but are not limited to, 1,3-butanediol diacrylate, 1,4-butanediol diacrylate, 1,4-butanediol dimethacrylate, 1,6-hexanediol diacrylate, 1,6-hexanediol dimethacrylate, diethylene glycol diacrylate, polyethylene glycol diacrylate, neopentyl glycol diacrylate, EO-modified bisphenol A diacrylate, EO-modified bisphenol F diacrylate, and neopentyl glycol diacrylate. Each of these compounds can be used alone or in combination with others.

Specific examples of the trifunctional radical polymerizable compounds include, but are not limited to, trimethylolpropane triacrylate (TMPTA), trimethylolpropane trimethacrylate, EO-modified trimethylolpropane triacrylate, PO-modified trimethylolpropane triacrylate, caprolactone-modified trimethylolpropane triacrylate, HPA-modified trimethylolpropane trimethacrylate, pentaerythritol triacrylate, pentaerythritol tetraacrylate (PETTA), glycerol triacrylate, ECH-modified glycerol triacrylate, EO-modified glycerol triacrylate, PO-modified glycerol triacrylate, tris(acryloxyethyl) isocyanurate, dipentaerythritol hexaacrylate (DPHA), caprolactone-modified dipentaerythritol hexaacrylate, dipentaerythritol hydroxypentaacrylate, alkyl-modified di pentaerythritol pentaacrylate, alkyl-modified dipentaerythritol tetraacrylate, alkyl-modified dipentaerythritol triacrylate, dimethylolpropane tetraacrylate (DTMPTA), pentaerythritol ethoxytetraacrylate, EO-modified phosphoric triacrylate, and 2,2,5,5-tetrahydroxymethylcyclopentanone tetraacrylate. Each of these compounds can be used alone or in combination with others.

In the above descriptions, "EO-modified", "PO-modified", and "ECH-modified" represent "ethyleneoxy-modified", "propyleneoxy-modified", and "epichlorohydrin-modified", respectively.

Specific examples of the functional monomers include, but are not limited to: fluorine-substituted monomers, such as octafluoropentyl acrylate, 2-perfluorooctylethyl acrylate, 2-perfluorooctylethyl methacrylate, and 2-perfluoroisononylethyl acrylate; polysiloxane-group-containing vinyl monomers having 20 to 70 siloxane repeating units, such as acryloyl polydimethylsiloxane ethyl, methacryloyl polydimethylsiloxane ethyl, acryloyl polydimethylsiloxane propyl, acryloyl polydimethylsiloxane butyl, diacryloyl polydimethylsiloxane diethyl; and acrylates and methacrylates. Each of these compounds can be used alone or in combination with others.

Specific examples of the polysiloxane-group-containing vinyl monomers include, but are not limited to, unsaturated monoesters represented by the following formula (I), having a polydimethylsiloxane group (where m is 1 or above) or a trimethylsilyl group (where m is zero):

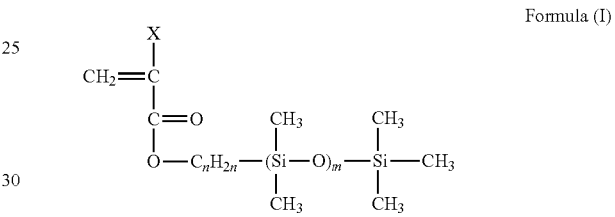

Formula (I)

where X represents a hydrogen atom or methyl group, n represents an integer of from 2 to 4, and m represents an average polymerization degree ranging from 0 to 70.

Specific examples of the unsaturated monoesters represented by the following formula (I) having a trimethylsilyl group include, but are not limited to, trimethylsilyl propyl acrylate, trimethylsilyl propyl methacrylate, trimethylsilyl butyl acrylate, and trimethylsilyl butyl methacrylate.

Specific examples of the unsaturated monoesters represented by the following formula (I) having a polydimethylsiloxane group (where m ranges from 0 to 70) include, but are not limited to, polydimethylsiloxane ethyl acrylate, polydimethylsiloxane ethyl methacrylate, polydimethylsiloxane propyl acrylate, polydimethylsiloxane propyl methacrylate, polydimethylsiloxane butyl acrylate, and polydimethylsiloxane butyl methacrylate.

Specific examples of the polysiloxane-group-containing vinyl monomers further include, but are not limited to, siloxane compounds represented by the following formula (II) having primary hydroxyl groups on both terminals:

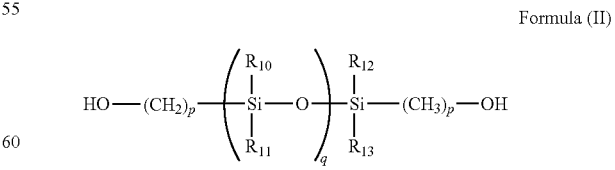

Formula (II)

where each of $R_{10}$, $R_{11}$, $R_{12}$, and $R_{13}$ independently represents an alkyl group having 1 to 4 carbon atoms, an aryl group, or a aralkyl group; p represents an integer ranging from 1 to 5; and q represents a number ranging from 3 to 1,000.

Preferably, $R_{10}$, $R_{11}$, $R_{12}$, and $R_{13}$ are all methyl groups, p is within the range of from 2 to 4, and q (indicating the average polymerization degree of siloxane units) is within the range of from 30 to 500, more preferably from 50 to 300.

Specific examples of the siloxane compounds represented by the following formula (II) include, but are not limited to, compounds (II-1) to (II-5) listed below.

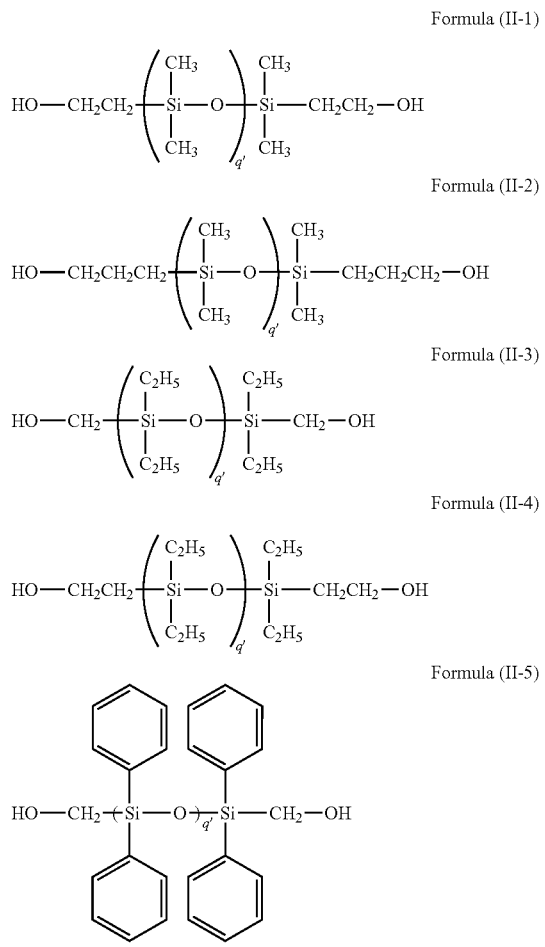

Specific examples of the radical polymerizable oligomers include, but are not limited to, epoxy acrylate oligomers, urethane acrylate oligomers, and polyester acrylate oligomers.

Preferably, at least one of the triarylamine-containing radical polymerizable compound and the other radical polymerizable compound has two or more radical polymerizable functional groups in view of an effective formation of a cross-lined product.

Preferably, the content rate of the triarylamine-containing radical polymerizable compound in the electrochromic composition is in the range of from 10% to 100% by mass. Although it depends on the process with which the electrochromic element is to be used, a more preferred content rate is in the range of from 30% to 90% by mass in view of an achievement of a balance between color developing sensitivity and durability against repeated use.

When the content rate is 10% by mass or more, the electrochromic layer can express a sufficient electrochromic function, high durability against repeated use under application of voltage, and high color developing sensitivity. Even when the content rate is 100% by mass, the electrochromic layer can express an electrochromic function. In this case, the color developing sensitivity of the electrochromic layer is high with respect to the thickness thereof. At the same time, by contrast, there may be a case in which the electrochromic layer becomes less compatible with an ionic liquid that is needed for giving and receiving charge, thereby causing deterioration of durability against repeated use under application of voltage and deterioration of electric properties.

Polymerization Initiator

Preferably, the electrochromic composition contains a polymerization initiator for the purpose of improving a cross-linking reaction efficiency between the triarylamine-containing radical polymerizable compound and the other radical polymerizable compound.

Examples of the polymerization initiator include, but are not limited to, thermal polymerization initiators and photopolymerization initiators. From the aspect of polymerization efficiency, photopolymerization initiators are preferable.

Specific examples of the thermal polymerization initiators include, but are not limited to, peroxide initiators (e.g., 2,5-dimethylhexane-2,5-dihydroperoxide, dicumyl peroxide, benzoyl peroxide, t-butylcumyl peroxide, 2,5-dimethyl-2,5-di(peroxybenzoyl)hexine-3, di-t-butyl peroxide, t-butyl hydroperoxide, cumene hydroperoxide, lauroyl peroxide) and azo initiators (e.g., azobisisobutyronitrile, azobiscyclohexanecarbonitrile, azobis(methyl isobutyrate), azobisisobutyl amidine hydrochloride, 4,4'-azobis-4-cyanovaleric acid). Each of these compounds can be used alone or in combination with others.

Specific examples of the photopolymerization initiators include, but are not limited to, acetophenone or ketal photopolymerization initiators (e.g., diethoxyacetophenone, 2,2-dimethoxy-1,2-diphenylethane-1-one, 1-hydroxycyclohexylphenylketone, 4-(2-hydroxyethoxy)phenyl-(2-hydroxy-2-propyl) ketone, 2-benzyl-2-dimethylamino-1-(4-morpholinophenyl)butanone-1, 2-hydroxy-2-methyl-1-phenylpropane-1-one, 2-methyl-2-morpholino(4-methylthiophenyl)propane-1-one, 1-phenyl-1,2-propanedione-2-(o-ethoxycarbonyl)oxime), benzoin ether photopolymerization initiators (e.g., benzoin, benzoin methyl ether, benzoin ethyl ether, benzoin isobutyl ether, benzoin isopropyl ether), benzophenone photopolymerization initiators (e.g., benzophenone, 4-hydroxybenzophenone, methyl o-benzoylbenzoate, 2-benzoyl naphthalene, 4-benzoyl biphenyl, 4-benzoyl phenyl ether, acrylated benzophenone, 1,4-benzoyl benzene), and thioxanthone photopolymerization initiators (e.g., 2-isopropyl thioxanthone, 2-chlorothioxanthone, 2,4-dimethylthioxanthone, 2,4-diethylthioxanthone, 2,4-dichlorothioxanthone). Each of these compounds can be used alone or in combination with others.

Specific examples of the photopolymerization initiators further include, but are not limited to, ethylanthraquinone, 2,4,6-trimethylbenzoyldiphenylphosphine oxide, 2,4,6-trimethylbenzoylphenyl ethoxyphosphine oxide, bis(2,4,6-trimethylbenzoyl)phenylphosphine oxide, bis(2,4-dimethoxybenzoyl)-2,4,4-trimethylpentylphosphine oxide, methylphenylglyoxy ester, 9,10-phenanthrene, acridine compounds, triazine compounds, and imidazole compounds. Each of these compounds can be used alone or in combination with others.

In addition, a photopolymerization accelerator may be used alone or in combination with the photopolymerization initiator. Specific examples of the photopolymerization accelerator include, but are not limited to, triethanolamine, methyldiethanolamine, ethyl 4-dimethylaminobenzoate, isoamyl 4-dimethylaminobenzoate, (2-dimethylamino)ethyl benzoate, and 4,4'-dimethylaminobenzophenone.

Other Components

Examples of the other components in the electrochromic layer include, but are not limited to, a solvent, a filler, a plasticizer, a leveling agent, a sensitizer, a dispersant, a surfactant, and an antioxidant.

Furthermore, electrolyte layer materials (to be described later) may be mixed with the electrochromic layer materials so that the electrochromic layer and the electrolyte layer are combined into a mixed layer.

Preferably, the electrochromic layer is formed by dissolving the triarylamine-containing radical polymerizable compound or the electrochromic composition in a solvent, formed into a film by coating, and polymerized by light and/or heat.

In particular, the electrochromic layer can be formed by spin coating, casting, micro gravure coating, gravure coating, bar coating, roll coating, wire bar coating, dip coating, slit coating, capillary coating, spray coating, nozzle coating, or various printing methods, such as gravure printing, screen printing, flexo printing, offset printing, reverse printing, and inkjet printing.

Preferably, the electrochromic layer has an average thickness of from 0.2 to 5.0 μm. When the average thickness of the electrochromic layer is in the above preferred range, advantageously, color development density becomes sufficient, manufacturing cost is reduced, and the occurrence of visibility decrease is suppressed even in a colored state.

Electrolyte Layer

The electrolyte included in the electrolyte layer may be either a solution of a solid electrolyte dissolved in a solvent or a liquid electrolyte such as an ionic liquid.

Specific materials usable for the electrolyte include, but are not limited to, inorganic ion salts (e.g., alkali metal salts, alkali-earth metal salts), quaternary ammonium salts, and supporting salts of acids and bases. More specifically, $LiClO_4$, $LiBF_4$, $LiAsF_6$, $LiPF_6$, $LiCF_3SO_3$, $LiCF_3COO$, $KCl$, $NaClO_3$, $NaCl$, $NaBF_4$, $NaSCN$, $KBF_4$, $Mg(ClO_4)_2$, and $Mg(BF_4)_2$, can be used. Each of these compounds can be used alone or in combination with others.

Ionic liquids prepared by a combination of these cationic and anionic components are preferable.

Specific examples of the solvent in which the solid electrolyte is dissolved include, but are not limited to, propylene carbonate, acetonitrile, γ-butyrolactone, ethylene carbonate, sulfolane, dioxolan, tetrahydrofuran, 2-methyltetrahydrofuran, dimethylsulfoxide, 1,2-dimethoxyethane, 1,2-ethoxymethoxyethane, polyethylene glycol, and alcohols. Each of these compounds can be used alone or in combination with others.

All ionic liquids having been generally researched or reported can be used.

Examples of such ionic liquids include organic ionic liquids which exhibit liquidity in a wide temperature range including room temperature, composed of a cationic component and an anionic component.

Specific examples of the cationic component include, but are not limited to, aromatic salts such as imidazole derivatives (e.g., N,N-dimethylimidazole salt, N,N-methylethylimidazole salt, N,N-methylpropylimidazole salt) and pyridinium derivatives (e.g., N,N-dimethylpyridinium salt, N,N-methylpropylpyridinium salt), and aliphatic quaternary ammonium salts such as tetraalkylammonium salts (e.g., trimethylpropylammonium salt, trimethylhexylammonium salt, triethylhexylammonium salt). Each of these components can be used alone or in combination with others.

From the aspect of stability in the atmosphere, specific preferred examples of anionic component include, but are not limited to, fluorine-containing compounds such as $BF_4^-$, $CF_3SO_3^-$, $PF_4^-$, $(CF_3SO_2)_2N^-$, $B(CN_4)^-$.

Preferably, the electrolyte layer is a solid electrolyte layer formed of a light-curable or heat-curable resin film holding an electrolyte therein.

Such an electrolyte layer can be formed by curing a mixture liquid of a curable resin, an electrolyte liquid, and an optically-transparent inorganic particle as an additive, in between the electrochromic layer and the anti-deterioration layer, by light or heat.

Specific examples of the curable resin include, but are not limited to, light-curable resins (e.g., acrylic resin, urethane resin, epoxy resin, vinyl chloride resin, ethylene resin, melamine resin, phenol resin) and heat-curable resins. Among these resins, those having high affinity for the electrolyte are preferable.

Examples of such materials include derivatives of ethylene glycol, such as polyethylene glycol and polypropylene glycol. In particular, light-curable resins are more preferably used as the curable resin. This is because the electrochromic element can be produced at a lower temperature within a shorter time period, compared to a case in which the resin is thinned through a thermal polymerization and/or solvent evaporation.

The inorganic particle is not limited to any particular material so long as it forms a porous layer that holds the electrolyte and the curable resin. Form the aspect of electrochromic reaction stability and visibility, materials having high insulating property, transparency, and durability are preferably used therefor. Specific materials usable for the inorganic particle include, but are not limited to, oxides and sulfates of silicon, aluminum, titanium, zinc, and tin, and mixtures thereof. In particular, an insulating metal oxide particle is preferably used.

The inorganic particle is not limited in size. Preferably, the inorganic particle has an average particle diameter in the range of from 10 nm to 10 μm, more preferably from 10 to 100 nm.

Anti-Deterioration Layer

The anti-deterioration layer has a function of undergoing the reverse reaction of a reaction occurring in the electrochromic layer to balance the charges therebetween, so that the second electrode is suppressed from being corroded or deteriorated by an irreversible redox reaction and thus the repetitive stability is improved. The reverse reaction includes both a redox reaction of the anti-deterioration layer and an action thereof as a capacitor.

Since the electrochromic layer transits from a transparent state to another state of developing color in the infrared range as an oxidation reaction occurs, preferably, the anti-deterioration layer includes a capacitor material that undergoes a reduction reaction in a transparent state or an electrochromic material that transits from a transparent state to a color developing state by a reduction reaction.

Preferably, such a capacitor material is formed of a conductive metal oxide particle and/or a semi conductive metal oxide particle fixed on the second electrode with a binder, to have a high capacity.

Specific examples of the conductive metal oxide particle include, but are not limited to, antimony tin oxide and fluorine-doped tin oxide. Specific examples of the semiconductive metal oxide particle include, but are not limited to, nickel oxide, titanium oxide, zinc oxide, and tin oxide. Each of these compounds can be used alone or in combination with others.

Specific examples of the binder include, but are not limited to, acrylic resin, alkyd resin, isocyanate resin, urethane resin, epoxy resin, phenol resin, and melamine resin.

In a case in which the anti-deterioration layer serves as a second electrochromic layer that undergoes the reverse reaction of a reaction occurring in the electrochromic layer, reaction efficiency in electrochromism (color development) is improved because both layers develop color. In addition, driving voltage is reduced. In this case, the above-described electrochromic layer serves as a first electrochromic layer.

Preferably, the second electrochromic layer includes a dipyridine compound represented by the following formula (4) as an electrochromic compound.

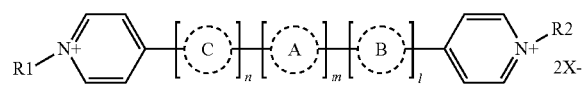

Formula (4)

In the formula (4), each of R1 and R2 independently represents a substituted or unsubstituted alkyl or aryl group having 1 to 8 carbon atoms. In a case in which the electrochromic compound is carried by a conductive particle and/or a semiconductive particle, at least one of R1 and R2 has a substituent selected from COOH, $PO(OH)_2$, and $Si(OC_kH2_{k+1})_3$, where k represents a numeral in the range of from 1 to 20. The substituent selected from COOH, $PO(OH)_2$, and $Si(OC_kH2_{k+1})_3$ included in R1 and/or R2 contributes to an adsorption reaction.

In the formula (4), each of A, B, and C independently represents a substituted or unsubstituted alkyl, aryl, or heterocyclic group having 1 to 20 carbon atoms.

In the formula (4), X represents a monovalent anion. The monovalent anion is not limited to a particular ion so long as it forms a stable pair with a cationic part. Specific examples of the monovalent anion include, but are not limited to, Br ion ($Br^-$), Cl ion ($Cl^-$), $ClO_4$ ion ($ClO_4^-$), $PF_6$ ion ($PF_6^-$), and $BF_4$ ion ($BF_4^-$).

In the formula (4), each of n, m, and l independently represents 0, 1, or 2.

The dipyridine compound represented by the formula (4) transits from a transparent state to a color developing state by a reduction reaction, thereby improving color density. When m is 1 in the formula (4), the dipyridine compound shows a light absorption band in the infrared range and thereby easily improves color density in the infrared range. The compound represented by the formula (4) may be formed into an organic film on the second electrode or carried by a conductive particle and/or a semiconductive particle. The latter is more preferable.

The organic electrochromic compound represented by the formula (4) may be mixed with the electrolyte layer materials so that the second electrochromic layer and the electrolyte layer are combined into a mixed layer.

Furthermore, the first electrochromic layer, the second electrochromic layer, and the electrolyte layer may be combined into a mixed layer.

In a case in which the second electrochromic layer is included in such a mixed layer, R1 and R2 do not necessarily have a group selected from COOH, $PO(OH)_2$, and $Si(OC_kH2_{k+1})_3$, where k represents a numeral in the range of from 1 to 20, that contributes to an adsorption reaction.

Specific examples of the dipyridine compound represented by the formula (4) include, but are not limited to, Example Compounds 43 to 54 listed below.

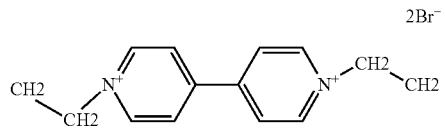

Example Compound 43

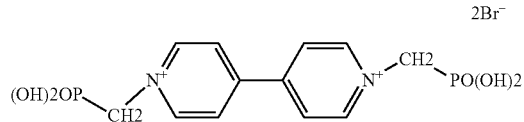

Example Compound 44

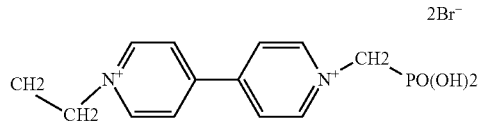

Example Compound 45

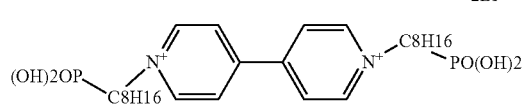

Example Compound 46

-continued
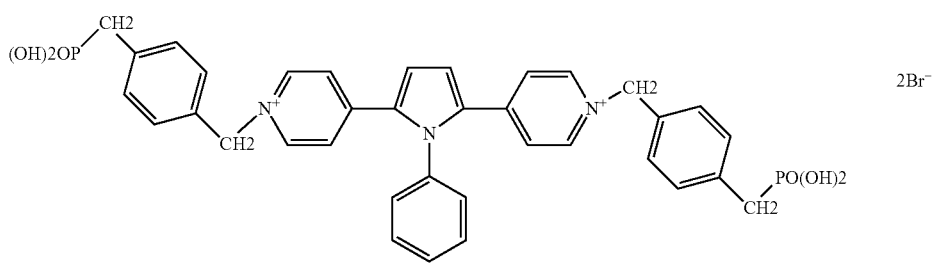
Example Compound 47
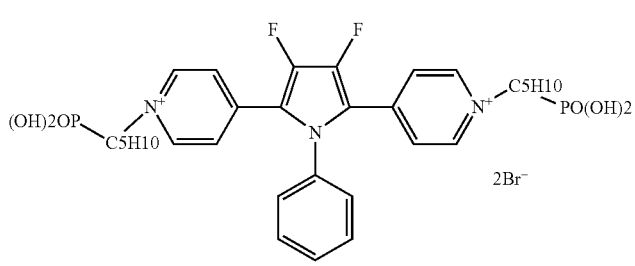
Example Compound 48
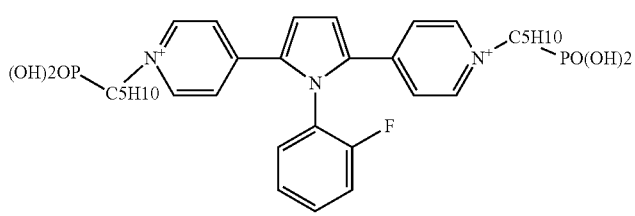
Example Compound 49
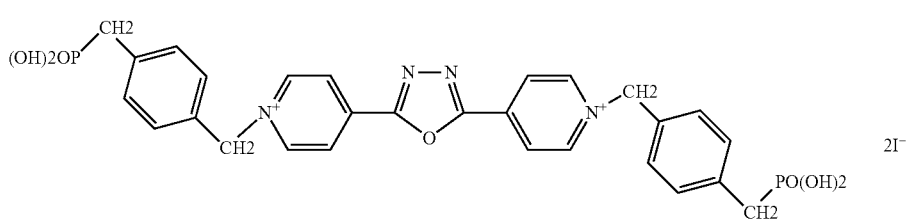
Example Compound 50
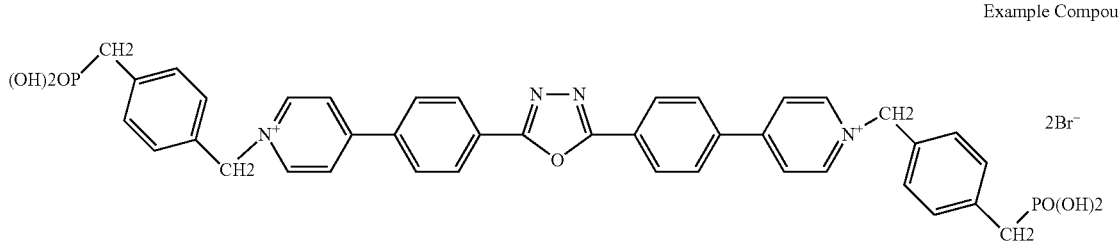
Example Compound 51
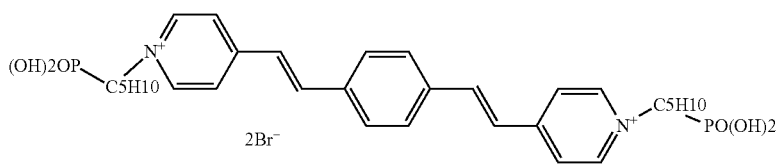
Example Compound 52
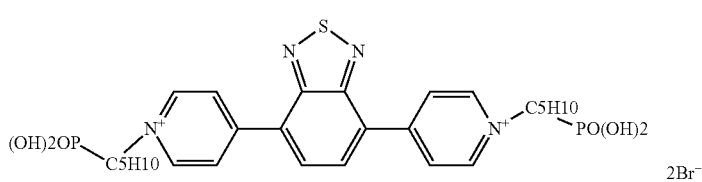
Example Compound 53

-continued

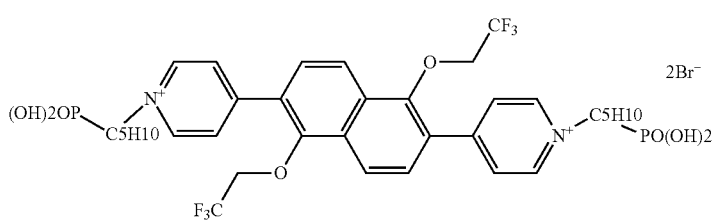

Example Compound 54

Specific preferred materials for the conductive and semiconductive particles include metal oxides, but are not limited thereto.

Specific examples of the metal oxides include, but are not limited to, titanium oxide, zinc oxide, tin oxide, zirconium oxide, cerium oxide, yttrium oxide, boron oxide, magnesium oxide, strontium titanate, potassium titanate, barium titanate, calcium titanate, calcium oxide, ferrite, hafnium oxide, indium oxide, tungsten oxide, iron oxide, copper oxide, nickel oxide, cobalt oxide, barium oxide, strontium oxide, vanadium oxide, aluminosilicate, and calcium phosphate. Each of these compounds can be used alone or in combination with others.

Among these compounds, titanium oxide, zinc oxide, tin oxide, zirconium oxide, magnesium oxide, indium oxide, tungsten oxide, iron oxide, and any mixture thereof are preferably used because the color development-discharge response speed becomes high. In particular, titanium oxide is most preferable because it becomes possible to reliably display color with a much higher response speed in color development-discharge.

The conductive and semiconductive particles are not limited in shape. Preferably, the conductive and semiconductive particles have a shape that has a large surface area per unit volume (hereinafter "specific surface area") for effectively carrying the electrochromic compound. For example, in a case in which the conductive and semiconductive particles are composed of an aggregate of nano particles, the electrochromic compound can be carried thereby in a more efficient manner owing to their large specific surface area thereof, thus providing an excellent display contrast ratio between color development and discharge.

The second electrochromic layer may include any conventional organic or inorganic electrochromic compounds.

Specific examples of usable organic electrochromic compounds other than the compound represented by the formula (4) include, but are not limited to, rare-earth phthalocyanine and styryl. Specific examples of usable conductive polymer include, but are not limited to, polypyrrol, polythiophene, polyaniline, and derivatives thereof.

Specific examples of usable inorganic electrochromic compounds include, but are not limited to, tungsten oxide, molybdenum oxide, iridium oxide, and titanium oxide.

Other Layers

The electrochromic device may further include other layers, such as an insulating porous layer and a protective layer.

Insulating Porous Layer

The insulating porous layer has a function of electrically insulating the first electrode and the second electrode from each other and another function of holding the electrolyte.

The insulating porous layer is made of a porous material. In particular, organic, inorganic, or organic-inorganic composite materials having high insulation property, durability, and film-formation property are preferably used.

The insulating porous layer can be formed by: a sintering method in which polymer fine particles or inorganic particles are partially fused with each other via a binder to form pores between the particles; or an extraction method in which solvent-soluble organic or inorganic substances and solvent-insoluble binders are formed into a layered structure, and the organic or inorganic substances are dissolved with a solvent to form pores; a foaming method; a phase inversion method in which a mixture of polymers is subjected to phase separation by handling a good solvent and a poor solvent; or a radiation irradiation method in which pores are formed by means of radiation.

Protective Layer

The protective layer has functions of protecting the electrochromic device from external stress and chemicals used in the washing process, preventing the electrolyte from leaking from the electrochromic device, and preventing the electrochromic device from being intruded by unnecessary substances, such as moisture and oxygen in the air, for its stable operation.

In addition, the protective layer prevents the electrochromic device from being damaged by external light such as ultraviolet light.

The protective layer may include an ultraviolet-curable or heat-curable resin such as acrylic resin, urethane resin, and epoxy resin.

Preferably, the protective layer has an average thickness of from 1 to 200 μm.

Method for Producing Electrochromic Device

The electrochromic device according to an embodiment of the present invention may be produced by a method including a coating process and a cross-linking process. The method may further include other processes, if needed.

Coating Process

The coating process is for coating the first electrode with a coating liquid including the triarylamine-containing radical polymerizable compound or the electrochromic composition.

Specific materials usable for the triarylamine-containing radical polymerizable compound and the other radical polymerizable compound have been described above.

The coating liquid may be diluted with a solvent, if necessary, before being coated on the first electrode.

Specific examples of the solvent include, but are not limited to, alcohol solvents (e.g., methanol, ethanol, propanol, butanol), ketone solvents (e.g., acetone, methyl ethyl ketone, methyl isobutyl ketone, cyclohexanone), ester solvents (e.g., ethyl acetate, butyl acetate), ether solvents (e.g., tetrahydrofuran, dioxane, propyl ether), halogen solvents (e.g., dichloromethane, dichloroethane, trichloroethane, chlorobenzene), aromatic solvents (e.g., benzene, toluene, xylene), and cellosolve solvents (e.g., methyl cellosolve, ethyl cellosolve, cellosolve acetate). Each of these solvents can be used alone or in combination with others.

The rate of dilution is determined depending on solubility of the coating liquid components, the coating method, and a target thickness of the electrochromic layer.

The coating method may be selected from, for example, dip coating, spray coating, bead coating, and ring coating.

Cross-Linking Process

The cross-linking process is for causing a cross-linking reaction in the coating liquid, including the triarylamine-containing radical polymerizable compound or the electrochromic composition, coated on the first electrode, by applying thermal or optical energy.

The coating liquid coated on the first electrode is given external energy to be hardened into an electrochromic layer.

The external energy may be selected from, for example, thermal energy, optical energy, or a radial ray.

Thermal energy can be given to the coating liquid coated on the first electrode by heating the coating liquid from the coated-surface side or the opposite substrate-side of the first electrode, using a gaseous substance (e.g., air, nitrogen gas), vapor, a heat medium, infrared ray, or electromagnetic wave.

In this case, preferably, the heating temperature is in the range of from 60° C. to 170° C.

Optical energy can be given to the coating liquid coated on the first electrode from a UV light source having light-emitting wavelengths in the ultraviolet rage, such as a high-pressure mercury lamp and a metal halide lamp, or a visible light source emitting light corresponding to the absorption wavelength of the radical polymerizable compounds or a photopolymerization initiator.

In this case, preferably, the amount of light emission is in the range of from 5 to 15,000 mW/cm$^2$.

The above-described method for producing the electrochromic device can be applied even in a case in which the first electrochromic layer and the electrolyte layer are combined into a mixed layer, the second electrochromic layer and the electrolyte layer are combined into a mixed layer, or the first electrochromic layer, the second electrochromic layer, and the electrolyte layer are combined into a mixed layer.

Other Processes

The method may further include other processes such as a first electrode forming process, a second electrode forming process, an anti-deterioration layer forming process, and a bonding process.

FIG. 1 is a schematic cross-sectional view of an electrochromic device according to a first embodiment of the present invention.

Referring to FIG. 1, an electrochromic device 10 includes a first substrate 11, a first electrode 12, a first electrochromic layer 13, an electrolyte layer 14, an anti-deterioration layer 15, a second electrode 16, a second substrate 17, and a protective layer 18, laminated on one another in the order as illustrated in FIG. 1.

As a voltage is applied to between lead portions of the first electrode 12 and the second electrode 16 to inject charge therein, a part of the first electrochromic layer 13 disposed overlapping the first electrode 12 and the second electrode 16 develops color. As the reverse voltage is applied thereto, the part of the first electrochromic layer 13 disposed overlapping the first electrode 12 and the second electrode 16 becomes transparent.

In a case in which the above-described second electrochromic layer is employed as the anti-deterioration layer 15, the second electrochromic layer undergoes the reverse reaction of a reaction occurring in the first electrochromic layer 13. As a voltage is applied to between the first electrode 12 and the second electrode 16 such that the first electrode 12 side becomes positive, the first electrochromic layer 13 undergoes an oxidation reaction to develop color, and the second electrochromic layer undergoes a reduction reaction to develop color. As the reverse voltage is further applied, the electrochromic layers discharge color.

Figure 2:
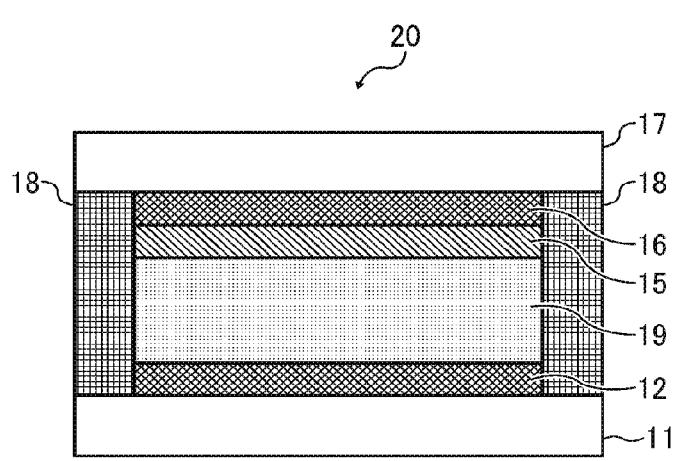
FIG. 2 is a schematic cross-sectional view of an electrochromic device according to a second embodiment of the present invention.

FIG. 2 is a schematic cross-sectional view of an electrochromic device according to a second embodiment of the present invention.

In FIG. 2, the same reference numbers are given to identical constituent elements such as parts and materials having the same functions as those describe above, and redundant descriptions thereof are omitted.

Referring to FIG. 2, an electrochromic device 20 according to the second embodiment is different from the electrochromic device 10 according to the first embodiment (illustrated in FIG. 1) in that the first electrochromic layer 13 and the electrolyte layer 14 are combined into an integrated layer 19.

Figure 3:
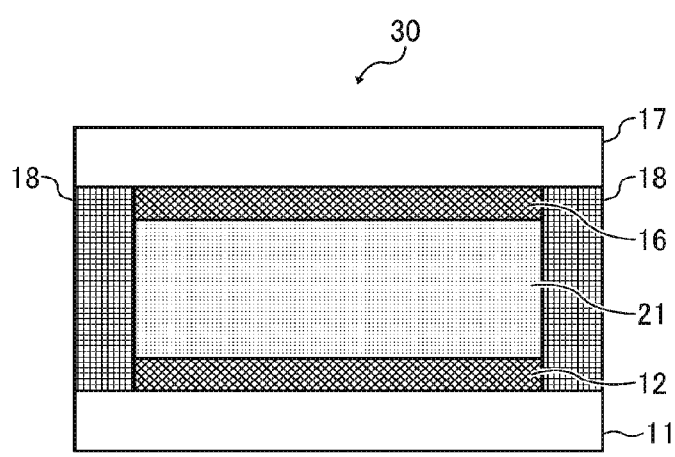
FIG. 3 is a schematic cross-sectional view of an electrochromic device according to a third embodiment of the present invention.

FIG. 3 is a schematic cross-sectional view of an electrochromic device according to a third embodiment of the present invention.

In FIG. 3, the same reference numbers are given to identical constituent elements such as parts and materials having the same functions as those describe above, and redundant descriptions thereof are omitted.

Referring to FIG. 3, an electrochromic device 30 according to the third embodiment is different from the electrochromic devices 10 and 20 respectively according to the first and second embodiments (respectively illustrated in FIGS. 1 and 2) in that the first electrochromic layer 13, the electrolyte layer 14, and the second electrochromic layer 15 are combined into an integrated layer 21.

Figure 4:
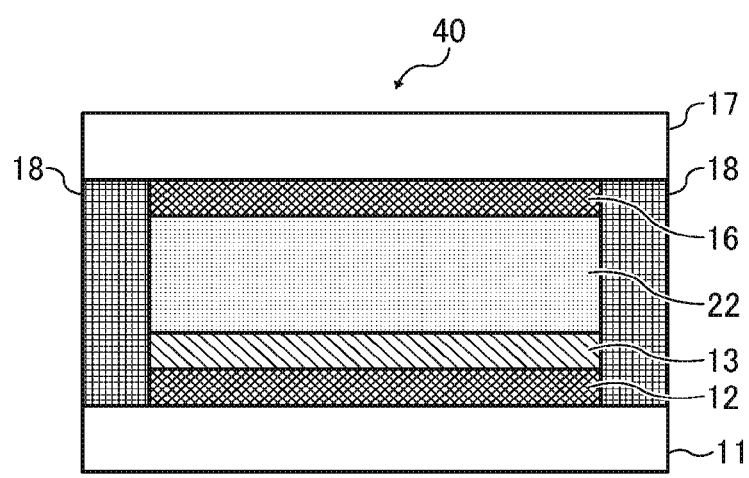
FIG. 4 is a schematic cross-sectional view of an electrochromic device according to a fourth embodiment of the present invention.

FIG. 4 is a schematic cross-sectional view of an electrochromic device according to a fourth embodiment of the present invention.

In FIG. 4, the same reference numbers are given to identical constituent elements such as parts and materials having the same functions as those describe above, and redundant descriptions thereof are omitted.

Referring to FIG. 4, an electrochromic device 40 according to the fourth embodiment is different from the electrochromic devices 10, 20, and 30 respectively according to the first, second, and third embodiments (respectively illustrated in FIGS. 1, 2, and 3) in that the second electrochromic layer 15 and the electrolyte layer 14 are combined into an integrated layer 22.

Figure 5:
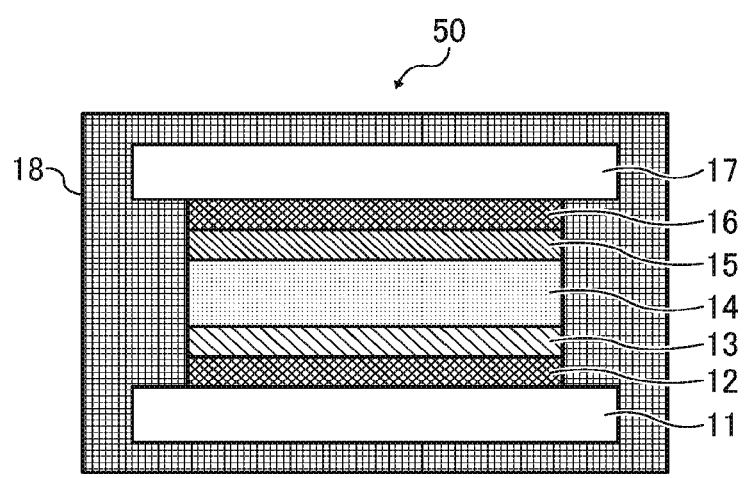
FIG. 5 is a schematic cross-sectional view of an electrochromic device according to a fifth embodiment of the present invention.

FIG. 5 is a schematic cross-sectional view of an electrochromic device according to a fifth embodiment of the present invention.

In FIG. 5, the same reference numbers are given to identical constituent elements such as parts and materials having the same functions as those describe above, and redundant descriptions thereof are omitted.

Referring to FIG. 5, an electrochromic device 50 according to the fifth embodiment is different from the electrochromic devices 10, 20, 30, and 40 respectively according to the first, second, third, and fourth embodiments (respectively illustrated in FIGS. 1, 2, 3, and 4) in that the protective layer 18 is formed not only on the side surfaces but also on the front and back surfaces.

Use Application

The electrochromic device according to some embodiments of the present invention can be used for, for example, large-size displays such as electrochromic display and stock price display, light control elements such as anti-glare mirror and light control glass, low-voltage driving elements such as touch-panel-type key switch, optical switch, optical memory, electronic paper, and electronic album. In particular, the electrochromic device according to some embodiments of the present invention that can expresses a high infrared light transmittance and can undergo a large change in infrared light transmittance is preferably used for light control glass devices such as electrochromic light control windows.

EXAMPLES

Further understanding of the present disclosure can be obtained by reference to certain specific examples provided herein below for the purpose of illustration only and are not intended to be limiting.

Example 1

Preparation of Electrochromic Device

The electrochromic device 10 illustrated in FIG. 1 was prepared in the following manner.

Formation of First Electrode

On a 30-mm-square region and a lead portion of the first substrate 11 (i.e., a 40-mm-square glass substrate having a thickness of 0.7 mm), the first electrode 12 including indium tin oxide was formed by sputtering. The sputtering target was a mixture of $In_2O_3$ and $SnO_2$ with the mass ratio ($In_2O_3/SnO_2$) of 95/5. The electrode pattern was formed with a metal mask. The glass substrate was heated to 200° C. The target film thickness was set to 110 nm.

The resulting first electrode 12 had an infrared light transmittance of 79% at a wavelength of 1,500 nm, a carrier density of $4\times10^{20}$ cm$^{-3}$ measured by the van der Pauw method, and a sheet resistance of 60Ω.

The infrared light transmittance at a wavelength of 1,500 nm was measured by a UV/Vis/NIR Spectrophotometer V-670 (product of JASCO Corporation).

The carrier density was measured by a Hall Effect Measurement System HL-5500PC (product of Bio-Rad Laboratories, Inc.) based on the van der Pauw method.

The sheet resistance was measured by a low resistivity meter LORESTA-AX (product of Mitsubishi Chemical Analytech Co., Ltd.).

Formation of Electrochromic Layer

An electrochromic layer forming liquid was prepared by mixing (a) a triarylamine-containing radical polymerizable compound having the following formula A (i.e., Example Compound 40), (b) polyethylene glycol diacrylate (KAYARAD PEG400DA available from Nippon Kayaku Co., Ltd.), (c) a photopolymerization initiator (IRGACURE 184 available from BASF), and (d) tetrahydrofuran, at a mass ratio (a)/(b)/(c)/(d) of 10/5/0.15/85.

The electrochromic layer forming liquid was applied onto the surface of the first electrode 12 (made of an ITO film) by spin coating, and thereafter subjected to an annealing treatment at 60° C. for 1 minute and exposed to ultraviolet ray to cure. Thus, the electrochromic layer 13 having an average thickness of 1.3 μm made of organic polymer materials was formed.

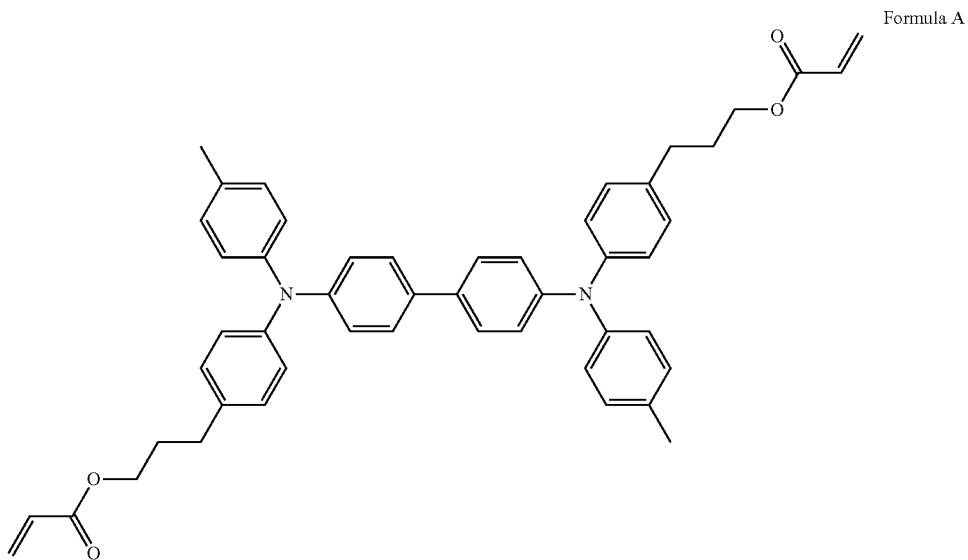 [SMILES: C=CC(=O)OCCCc1ccc(N(c2ccc(C)cc2)c2ccc(-c3ccc(N(c4ccc(C)cc4)c4ccc(CCCOC(=O)C=C)cc4)cc3)cc2)cc1]

Formula A

Formation of Second Electrode and Anti-Deterioration Layer

On the second substrate 17 having the same shape as the first substrate 11, the second electrode 16 was formed in the same manner as the first electrode 12. The resulting second electrode 16 had the same infrared light transmittance at a wavelength of 1,500 nm, carrier density, and sheet resistance as the first electrode 12.

A methanol dispersion liquid of tin oxide (CELNAX, product of Nissan Chemical Industries, Ltd.) in which 1% by mass of polyvinyl butyral had been mixed was applied onto the second electrode 16 by spin coating, and thereafter subjected to an annealing treatment at 120° C. for 5 minutes. Thus, the anti-deterioration layer 15 was formed.

Bonding and Formation of Solid Electrolyte Layer

An electrolyte solution was prepared by mixing (a) 1-ethyl-3-methylimidazolium $(FSO_2)_2N^-$ salt, (b) polyethylene glycol diacrylate (KAYARAD PEG400DA available from Nippon Kayaku Co., Ltd.), and (c) a photopolymerization initiator (TRGACURE 184 available from BASF), at a mass ratio (a)/(b)/(c) of 2/1/0.01.

Figure 6A:
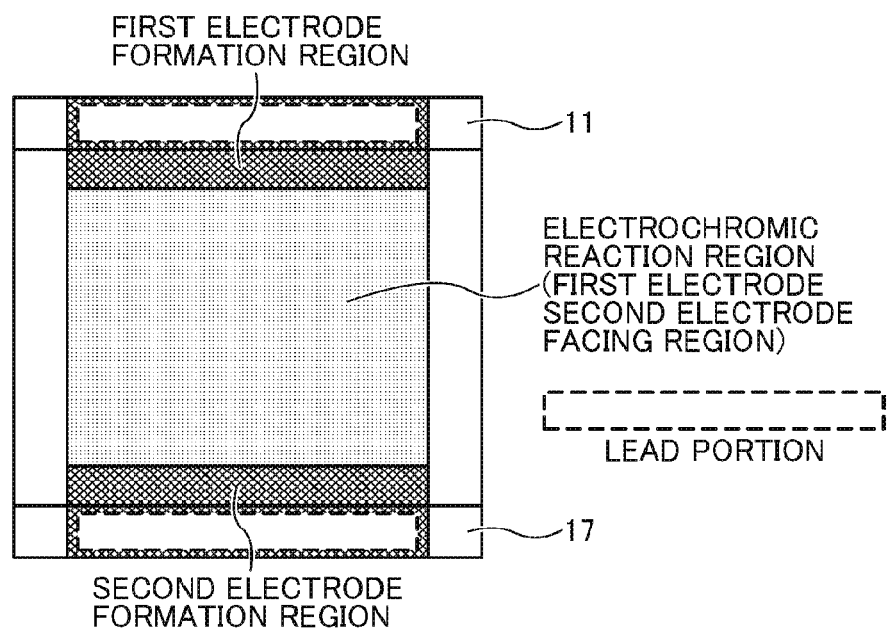
FIG. 6A is a schematic cross-sectional view of an electrochromic device according to an embodiment of the present invention after a bonding process.
Figure 6B:
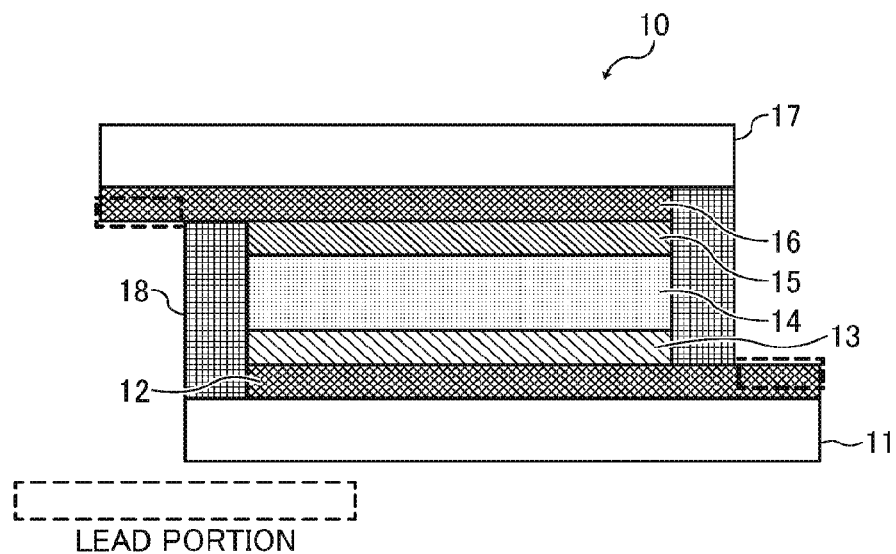
FIG. 6B is a schematic cross-sectional view of the electrochromic device illustrated in FIG. 6A in a longitudinal direction.

The electrolyte solution was filled in between the electrochromic layer 13 and the anti-deterioration layer 15, and thereafter subjected to an annealing treatment at 60° C. for 1 minute and exposed to ultraviolet ray to cure. Thus, a bonded body (illustrated in FIGS. 6A and 6B) was prepared. FIGS. 6A and 6B are cross-sectional views in short and longitudinal directions, respectively. The first substrate 11 and the second substrate 17 were displaced in the longitudinal direction.

The filling amount of the electrolyte solution was adjusted such that the average thickness of the solid electrolyte layer became 30 μm. The lead portions of the electrodes were disposed outside the bonding region. As illustrated in FIG. 6B, the bonding region refers to the region where the first substrate 11 and the second substrate 17 were overlapped.

Next, an ultraviolet-curable resin (KAYARAD R604 available from Nippon Kayaku Co., Ltd.) was applied to the side surfaces of the bonded body and exposed to ultraviolet ray to cure. Thus, an electrochromic device 10(A) having the configuration illustrated in FIG. 1 was prepared. The electrochromic device 10(A) can be used as a light control glass device.

Color-Development and Color-Discharging Driving

The above-prepared electrochromic device 10(A) was subjected to an evaluation of color developing and discharging property as follows. First, a voltage of +2 V was applied to between the lead portions of the first electrode 12 and the second electrode 16 to inject a charge of 5 mC/cm² therein. As a result, an infrared absorption spectrum derived from the compound having the formula A was observed in an overlap portion where the first electrode 12 and the second electrode 16 were overlapped. In addition, a light absorption band was generated within a wavelength range of from 750 to 1,500 nm, thereby reducing the light transmittance, as shown by the curve "Formula A" in FIG. 7.

Next, a voltage of −1 V was applied to between the lead portions of the first electrode 12 and the second electrode 16 to emit the charge. As a result, the overlap portion where the first electrode 12 and the second electrode 16 were overlapped discharged color and became transparent. The light transmittance in a wavelength range of from 450 to 1,000 nm was 60% or more.

The light transmittance was measured by a UV/Vis/NIR Spectrophotometer V-670 (product of JASCO Corporation).

Example 2

Preparation of Electrochromic Device

The procedure in Example 1 was repeated except for replacing the triarylamine-containing radical polymerizable compound having the formula A (i.e., Example Compound 40) with another triarylamine-containing radical polymerizable compound having the following formula B (i.e., Example Compound 41). Thus, an electrochromic device 10(B) was prepared.

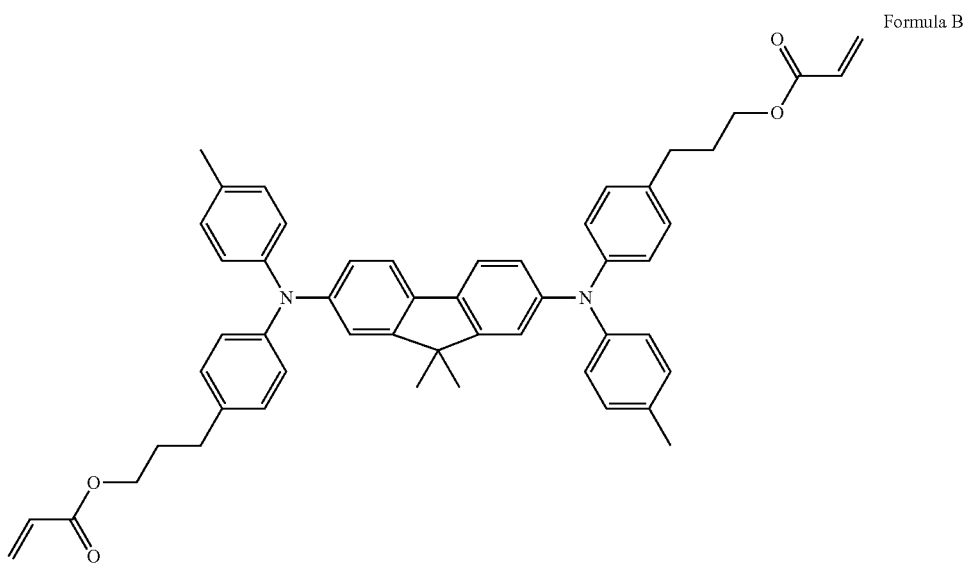 [SMILES: C=CC(=O)OCCCc1ccc(N(c2ccc(C)cc2)c2ccc3c(c2)C(C)(C)c2cc(N(c4ccc(C)cc4)c4ccc(CCCOC(=O)C=C)cc4)ccc2-3)cc1]

Formula B

Example 3

Preparation of Electrochromic Device

The procedure in Example 1 was repeated except for replacing the triarylamine-containing radical polymerizable compound having the formula A (i.e., Example Compound 40) with another triarylamine-containing radical polymerizable compound having the following formula C (i.e., Example Compound 42). Thus, an electrochromic device 10(C) was prepared.

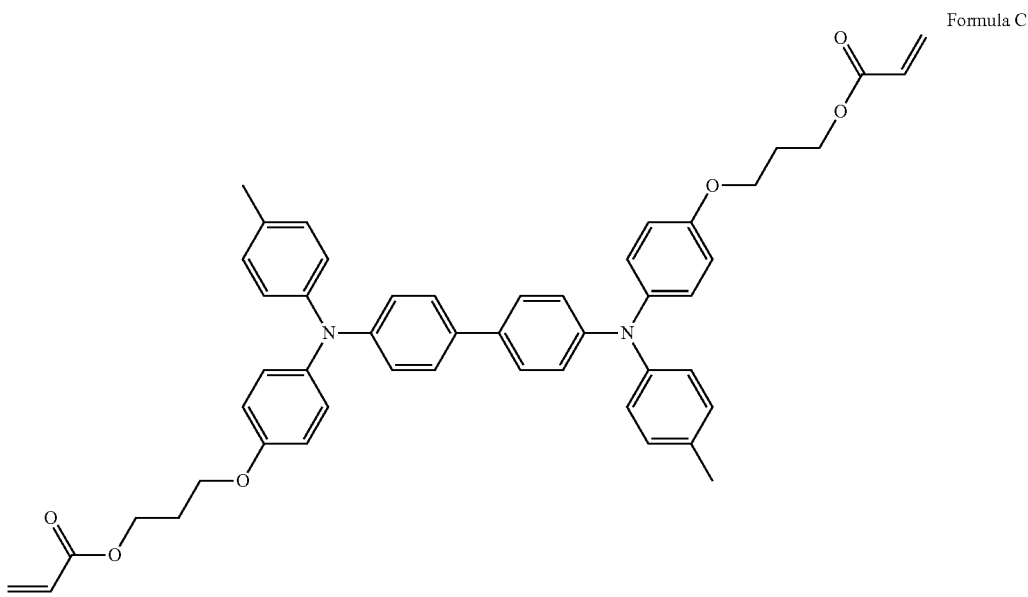 [SMILES: C=CC(=O)OCCCOc1ccc(N(c2ccc(C)cc2)c2ccc(-c3ccc(N(c4ccc(C)cc4)c4ccc(OCCCOC(=O)C=C)cc4)cc3)cc2)cc1]

Formula C

Example 4

Preparation of Electrochromic Device

The procedure in Example 1 was repeated except for replacing the triarylamine-containing radical polymerizable compound having the formula A (i.e., Example Compound 40) with another triarylamine-containing radical polymerizable compound having the following formula D (i.e., Example Compound 2). Thus, an electrochromic device 10(D) was prepared.

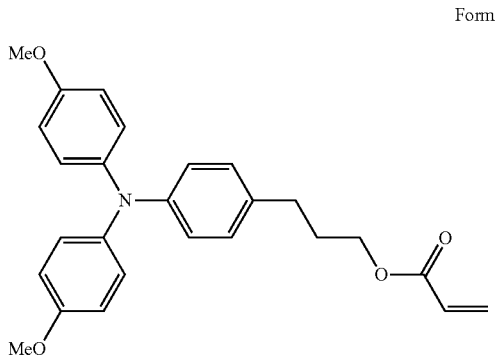

Formula D

In the formula D, Me represents methyl group.

Color-Development and Color-Discharging Driving

The above-prepared electrochromic devices 10(B), 10(C), and 10(D) were subjected to an evaluation of color developing and discharging property as follows. First, a voltage of +2 V was applied to between the lead portions of the first electrode 12 and the second electrode 16 to inject a charge of 5 mC/cm$^2$ therein. As a result, an infrared absorption spectrum derived from the compound having the formula B, C, or D was observed in an overlap portion where the first electrode 12 and the second electrode 16 were overlapped, in the respective electrochromic devices 10(B), 10(C), and 10(D). In addition, a light absorption band was generated within a wavelength range of from 750 to 1,500 nm, thereby reducing the light transmittance, as shown by the curves "Formula B", "Formula C", and "Formula D" in FIG. 7.

Figure 7:
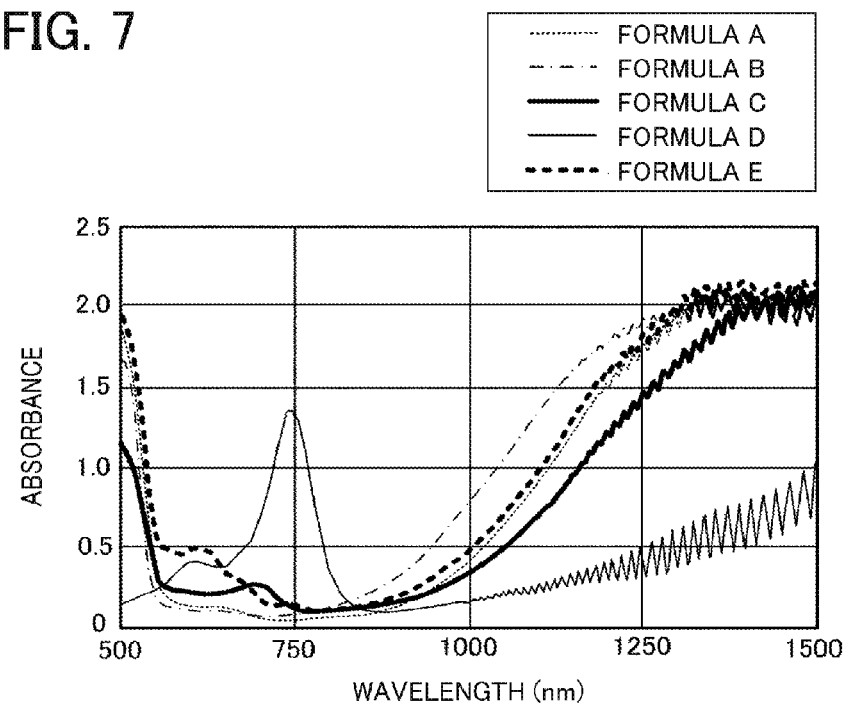
FIG. 7 is a graph showing infrared absorption spectra of the electrochromic compounds used in Examples.

FIG. 7 indicates that the compound having the formula B, corresponding to the compound having the formula (1-1) in which a pair of $R_{40}$ and $R_{42}$ is sharing bond connectivity to form a ring, exhibited the largest light absorption band within a wavelength range of from 750 to 1,500 nm.

Next, a voltage of −1 V was applied to between the lead portions of the first electrode 12 and the second electrode 16 to emit the charge. As a result, the overlap portion where the first electrode 12 and the second electrode 16 were overlapped discharged color and became transparent, in all the electrochromic devices 10(B), 10(C), and 10(D). The light transmittance in a wavelength range of from 450 to 1,000 nm was 60% or more in all the electrochromic devices 10(B), 10(C), and 10(D).

The light transmittance was measured by a UV/Vis/NIR Spectrophotometer V-670 (product of JASCO Corporation).

Example 5

Preparation of Electrochromic Device

Formation of Second Electrochromic Layer

The procedure in Example 1 was repeated except for processing the anti-deterioration layer into the second electrochromic layer by applying a 2% (by mass) 2,2,3,3-tetrafluoropropanol solution of a compound having the following formula E (i.e., Example Compound 46) onto the tin oxide layer (anti-deterioration layer) by spin coating, followed by an annealing treatment at 120° C. for 5 minutes. Thus, an electrochromic device 10(E) was prepared.

Formula E

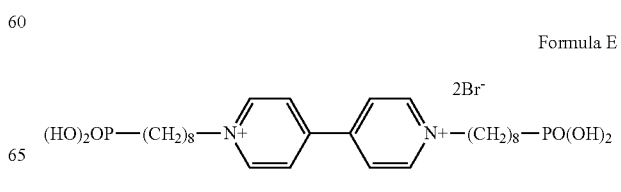

Color-Development and Color-Discharging Driving

The above-prepared electrochromic device 10(E) was subjected to an evaluation of color developing and discharging property as follows. First, a voltage of +1.5 V was applied to between the lead portions of the first electrode 12 and the second electrode 16 to inject a charge of 5 mC/cm$^2$ therein. As a result, an infrared absorption spectrum derived from the compound having the formula A and the compound having the formula E was observed in an overlap portion where the first electrode 12 and the second electrode 16 were overlapped. The reaction occurred at a lower voltage than in Example 1. In addition, a light absorption band was generated within a wavelength range of from 750 to 1,500 nm, thereby reducing the light transmittance, as shown by the curve "Formula E" in FIG. 7. The light transmittance was measured by a UV/Vis/NIR Spectrophotometer V-670 (product of JASCO Corporation).

Next, a voltage of −1 V was applied to between the lead portions of the first electrode 12 and the second electrode 16 to emit the charge. As a result, the overlap portion where the first electrode 12 and the second electrode 16 were overlapped discharged color and became transparent. The light transmittance in a wavelength range of from 450 to 1,000 nm was 60% or more, and the color developing voltage was reduced.

Example 6

Preparation of Electrochromic Device
Formation of First Electrode and Measurement of Light Transmittance and Crystallinity On a 30-mm-square region and a lead portion of the first substrate 11 (i.e., a 40-mm-square glass substrate having a thickness of 0.7 mm), the first electrode 12 including indium tin oxide was formed by sputtering. The sputtering target was a mixture of $In_2O_3$ and $SnO_2$ with the mass ratio ($In_2O_3/SnO_2$) of 90/10. The electrode pattern was formed with a metal mask. The substrate was not heated during formation of the electrode film, but heated to 150° C. for 0.5 hours or 8 hours after formation of the electrode film.

The sputtering power was set to 1 kW (partial pressure of $O_2$ in Ar—$O_2$ mixed gas was 0.3) or 6.5 kW (partial pressure of $O_2$ in Ar—$O_2$ mixed gas was 3.6). The target film thickness was set to 110 nm. The sheet resistance was adjusted to 60Ω or less in all samples. The sheet resistance was measured by a low resistivity meter LORESTA-AX (product of Mitsubishi Chemical Analytech Co., Ltd.).

Figure 8:
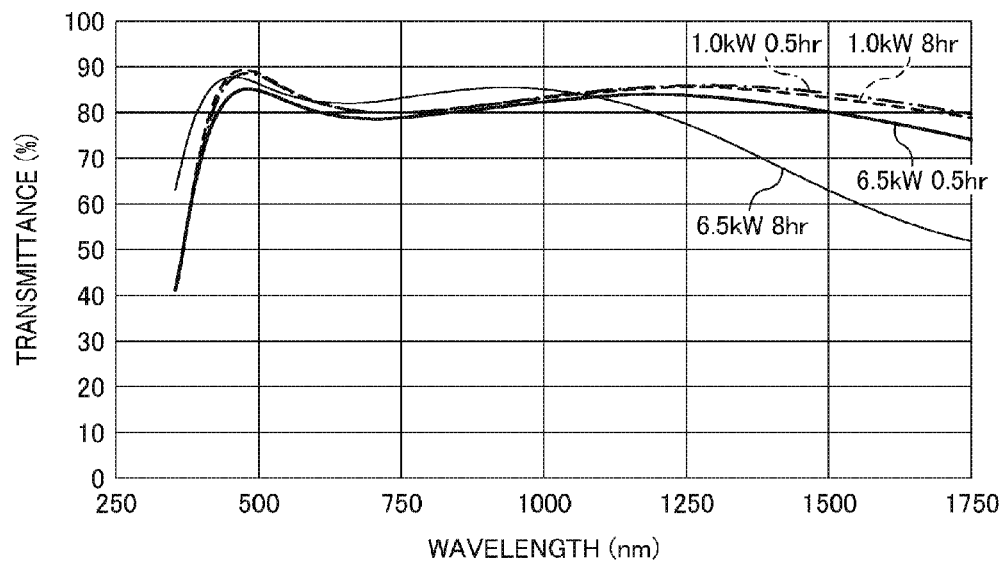
FIG. 8 is a graph showing light transmittance of the first electrode in Example 6.
Figure 9A:
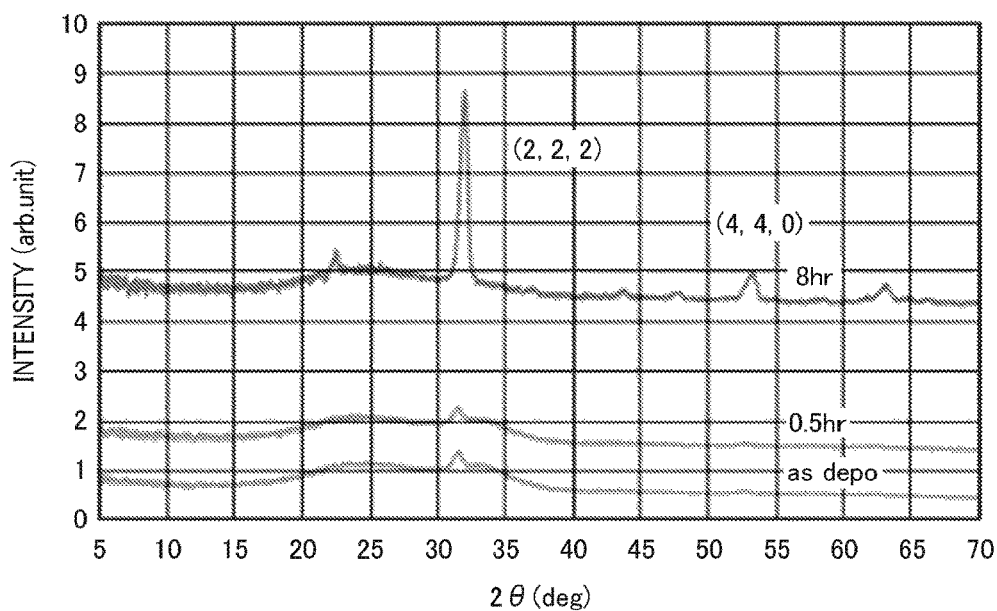
FIG. 9A is a graph showing an X-ray diffraction (XRD) spectrum of the first electrode in Example 6 formed under a sputtering power of 6.5 kW.
Figure 9B:
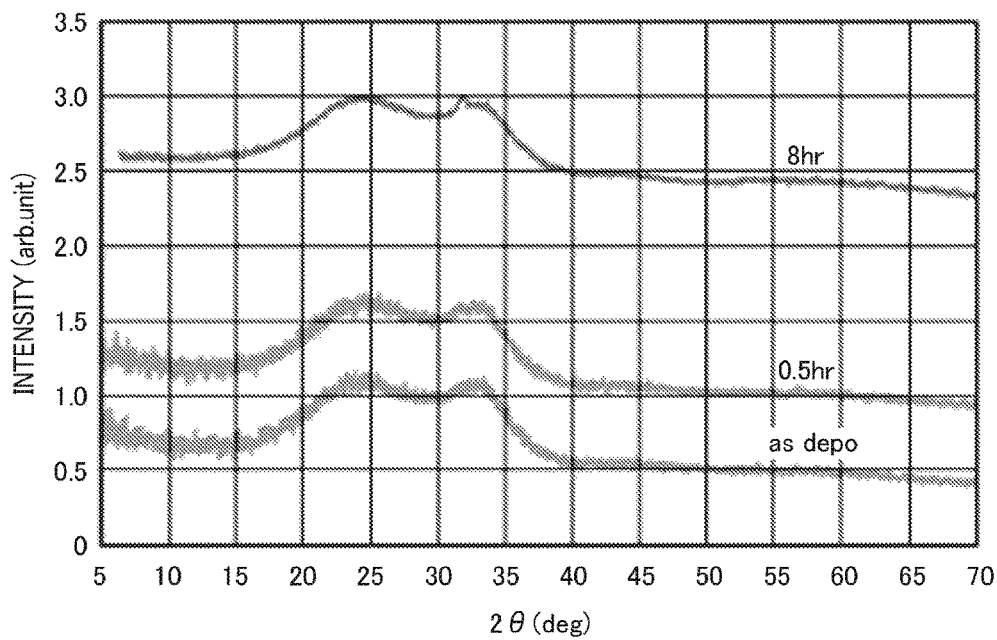
FIG. 9B is a graph showing an X-ray diffraction (XRD) spectrum of the first electrode in Example 6 formed under a sputtering power of 1.0 kW.

The light transmittance of the resulting first electrode 12 was measured by a UV-Visible/NIR Spectrophotometer UH4150 (product of Hitachi High-Tech Science Corporation). The results are shown in FIG. 8. The crystallinity was measured by an X-ray diffractometer (XRD) D8 DISCOVER (product of BRUKER). The results are shown in FIGS. 9A and 9B. Under the condition in which the sputtering power was 6.5 kW and the annealing treatment was performed at 150° C. for 8 hours, the light transmittance at a wavelength of 1,500 nm did not reach 70%. The crystallinity measured by XRD was high. A (440) plane peak was detected at around 2θ≃52 (deg.), and an intensity ratio (I440/I222) of the (440) plane peak to a main (222) plane peak detected at around 2θ≃32 (deg.) was 0.14.

Example 7

Preparation of Electrochromic Device
Formation of First Electrode and Measurement of Light Transmittance and Crystallinity The procedure in Example 6 for preparing a transparent electrode was repeated except for changing the sputtering target to a mixture of $In_2O_3$ and $ZrO_2$ with the mass ratio ($In_2O_3/ZrO_2$) of 90/10 (SSR available from Tosoh Corporation) and setting the sputtering power to 1 kW (partial pressure of $O_2$ in Ar—$O_2$ mixed gas was 0.4) or 6.5 kW (partial pressure of $O_2$ in Ar—$O_2$ mixed gas was 2.5). The sheet resistance was 60Ω or less. The sheet resistance was measured by a low resistivity meter LORESTA-AX (product of Mitsubishi Chemical Analytech Co., Ltd.).

Figure 10:
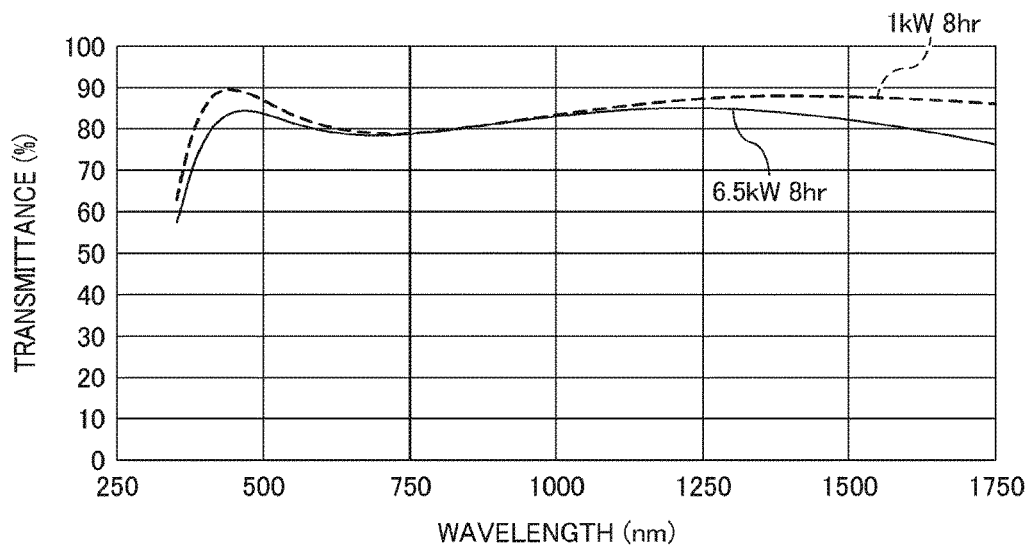
FIG. 10 is a graph showing light transmittance of the first electrode in Example 7.
Figure 11:
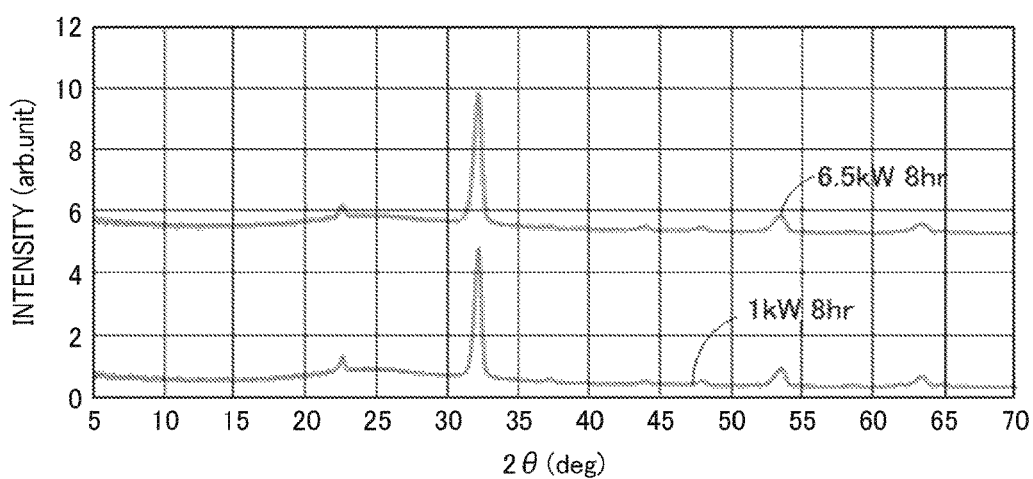
FIG. 11 is a graph showing an X-ray diffraction (XRD) spectrum of the first electrode in Example 7.

The light transmittance of the resulting first electrode 12 was measured by a UV-Visible/NIR Spectrophotometer UH4150 (product of Hitachi High-Tech Science Corporation). The results are shown in FIG. 10. The crystallinity was measured by an X-ray diffractometer D8 DISCOVER (product of BRUKER). The results are shown in FIG. 11. These results indicate that the light transmittance at a wavelength of 1,500 nm became 70% or more under the sputtering power of either 1 kW or 6.5 kW. In the XRD measurement, a (440) plane peak was detected at around 2θ≃52 (deg.). An intensity ratio (I440/I222) of the (440) plane peak to a main (222) plane peak detected at around 2θ≃32 (deg.) was 0.11 under each condition.

Example 8

Preparation of Electrochromic Device
Formation of Second Electrochromic Layer

Figure 12:
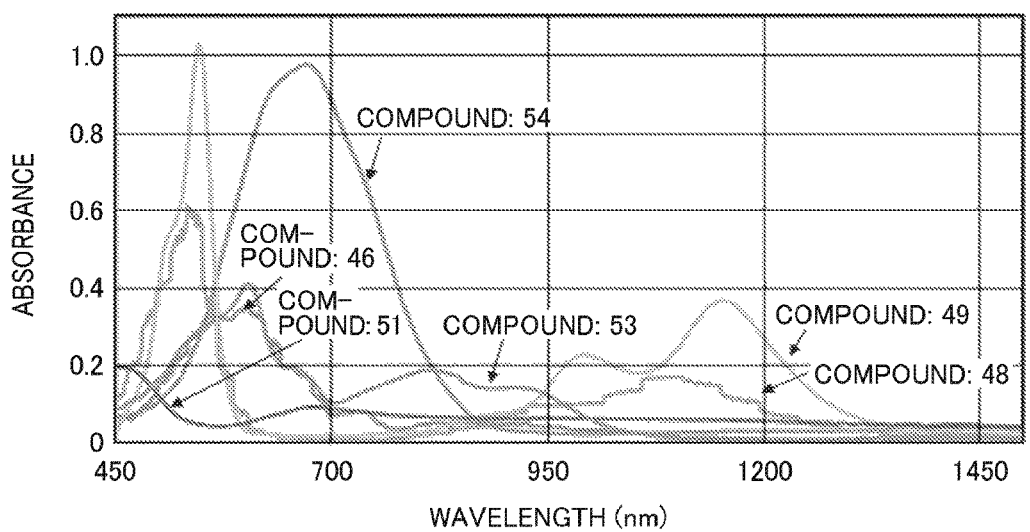
FIG. 12 is a graph showing light absorption spectra of the second electrochromic compounds used in Example 8.

The procedure in Example 5 was repeated except for eliminating the first electrochromic layer was and replacing the anti-deterioration layer with the second electrochromic layer containing the respective Example Compounds 46, 48, 49, 51, 53, and 54. Thus, six types of the electrochromic device 10 were prepared.
Color-Development and Color-Discharging Driving The above-prepared electrochromic devices 10 were subjected to an evaluation of color developing and discharging property as follows. First, a voltage of +3.5 V was applied to between the lead portions of the first electrode 12 and the second electrode 16 to inject a charge of 5 mC/cm$^2$ therein. As a result, a light absorption spectrum derived from each electrochromic compound in the electrochromic layer was observed in an overlap portion where the first electrode 12 and the second electrode 16 were overlapped. In addition, a light absorption band was generated within a wavelength range of from 450 to 1,000 nm, thereby reducing the light transmittance, as shown in FIG. 12. When the Example Compound 48, 49, or 53 was used, a light absorption band was also generated in a wavelength range of from 750 to 1,500 nm.

The light transmittance was measured by a UV-Visible/NIR Spectrophotometer UH4150 (product of Hitachi High-Tech Science Corporation).

Example 9

Preparation of Electrochromic Device
Formation of Second Electrochromic Layer

The procedure in Example 1 was repeated except for eliminating the tin oxide anti-deterioration layer and forming an integrated layer by curing the electrolyte solution in which 1% by mass of Example Compound 43 had been mixed in. Thus, the electrochromic device 40 was prepared in which the second electrochromic layer and the electrolyte layer had been combined into the integrated layer.

Color-Development and Color-Discharging Driving

The above-prepared electrochromic device 40 was subjected to an evaluation of color developing and discharging property as follows. First, a voltage of +1.5 V was applied to between the lead portions of the first electrode 12 and the second electrode 16 to inject a charge of 5 mC/cm$^2$ therein. As a result, an infrared absorption spectrum derived from the Example Compound 43, the main backbone of which being similar to that of the compound having the formula E, was observed in an overlap portion where the first electrode 12 and the second electrode 16 were overlapped. In addition, a light absorption band that is similar to that shown by the curve "Formula E" in FIG. 7 was generated within a wavelength range of from 750 to 1,500 nm, thereby reducing the light transmittance.

Next, a voltage of −1 V was applied to between the lead portions of the first electrode 12 and the second electrode 16 to emit the charge. As a result, the overlap portion where the first electrode 12 and the second electrode 16 were overlapped discharged color and became transparent. The light transmittance in a wavelength range of from 450 to 1,000 nm was 60% or more, and the color developing voltage was reduced.

Example 10

Preparation of Electrochromic Device

The procedure in Example 5 was repeated except for changing the glass substrates to polycarbonate substrates having a thickness of 0.3 mm, changing the sputtering target to a mixture of $In_2O_3$ and $SnO_2$ with the mass ratio ($In_2O_3$/$SnO_2$) of 90/10, setting the sputtering power to 6.5 kW (partial pressure of $O_2$ in Ar—$O_2$ mixed gas was 3.6), and setting the target film thickness to 110 nm. Thus, and electrochromic device 10(F) was prepared. The substrate was not heated during formation of the electrode film, but heated to 120° C. for 0.5 hours after formation of the electrode film. The sheet resistance of the electrode was 53Ω.

The resulting first electrode 12 and second electrode 16 had an infrared light transmittance of 84% at a wavelength of 1,500 nm.

Color-Development and Color-Discharging Driving

Figure 13:
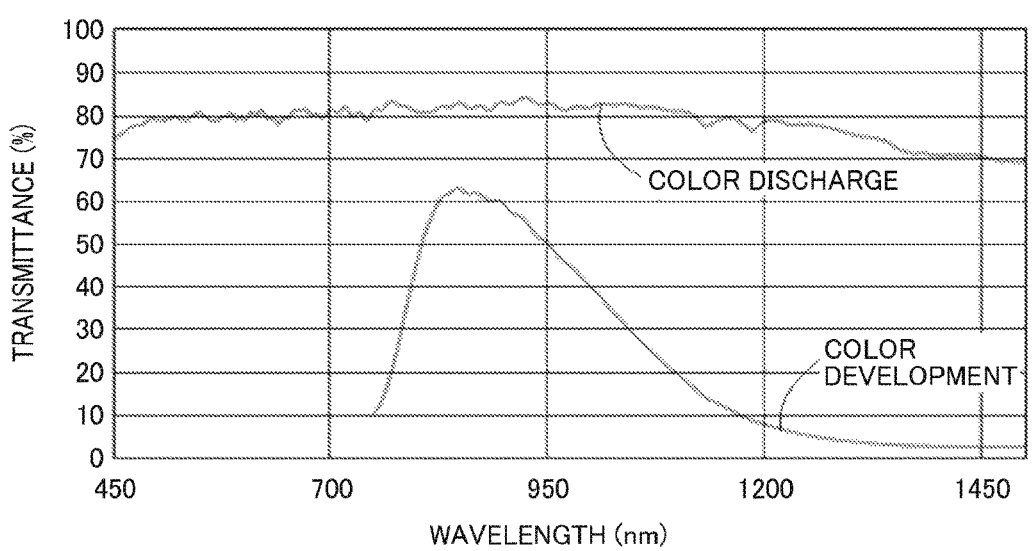
FIG. 13 is a graph showing light transmittance of the electrochromic compound used in Example 10.

The above-prepared electrochromic device 10(F) was subjected to an evaluation of color developing and discharging property as follows. First, a voltage of +1.5 V was applied to between the lead portions of the first electrode 12 and the second electrode 16 to inject a charge of 7 mC/cm$^2$ therein. As a result, an infrared absorption spectrum derived from the compound having the formula A and the compound having the formula E was observed in an overlap portion where the first electrode 12 and the second electrode 16 were overlapped. In addition, a light absorption band was generated within a wavelength range of from 750 to 1,500 nm, thereby reducing the light transmittance, as shown in FIG. 13.

Next, a voltage of −1 V was applied to between the lead portions of the first electrode 12 and the second electrode 16 to emit the charge. As a result, the overlap portion where the first electrode 12 and the second electrode 16 were overlapped discharged color and became transparent. The light transmittance in a wavelength range of from 450 to 1,000 nm was 70% or more.

The light transmittance was measured by a UV-Visible/NIR Spectrophotometer UH4150 (product of Hitachi High-Tech Science Corporation).

Comparative Example 1

Preparation of Electrochromic Device

The procedure in Example 1 was repeated except for changing the sputtering target to a mixture of $In_2O_3$ and $SnO_2$ with the mass ratio ($In_2O_3$/$SnO_2$) of 85/15 in forming the first electrode. Thus, and electrochromic device 10(G) was prepared in the following manner.

Formation of First Electrode

On a 30-mm-square region and a lead portion of the first substrate 11 (i.e., a 40-mm-square glass substrate having a thickness of 0.7 mm), the first electrode 12 including indium tin oxide was formed by sputtering. The sputtering target was a mixture of $In_2O_3$ and $SnO_2$ with the mass ratio ($In_2O_3$/$SnO_2$) of 85/15. The electrode pattern was formed with a metal mask. The glass substrate was heated to 200° C. The target film thickness was set to 110 nm.

The resulting first electrode 12 had an infrared light transmittance of 40% at a wavelength of 1,500 nm when measured in the same manner as in Example 1, a carrier density of $1 \times 10^{21}$ cm$^{-3}$ measured by the van der Pauw method, and a sheet resistance of 20Ω. The sheet resistance was measured by a low resistivity meter LORESTA-AX (product of Mitsubishi Chemical Analytech Co., Ltd.).

Color-Development and Color-Discharging Driving

The above-prepared electrochromic device 10(G) was subjected to an evaluation of color developing and discharging property as follows. First, a voltage of +2 V was applied to between the lead portions of the first electrode 12 and the second electrode 16 to inject a charge of 5 mC/cm$^2$ therein. As a result, an infrared absorption spectrum derived from the compound having the formula A was observed in an overlap portion where the first electrode 12 and the second electrode 16 were overlapped. In addition, a light absorption band was generated within a wavelength range of from 750 to 1,500 nm, thereby reducing the light transmittance.

Next, a voltage of −1 V was applied to between the lead portions of the first electrode 12 and the second electrode 16 to emit the charge. As a result, the overlap portion where the first electrode 12 and the second electrode 16 were overlapped discharged color and became transparent. The light transmittance in a wavelength range of from 450 to 1,000 nm was 60% or more, and the color developing voltage was reduced.

The light transmittance was measured by a UV/Vis/NIR Spectrophotometer V-670 (product of JASCO Corporation).

Comparative Example 2

Preparation of Electrochromic Device

The procedure in Example 1 was repeated except for changing the sputtering target to a mixture of $In_2O_3$ and $SnO_2$ with the mass ratio ($In_2O_3$/$SnO_2$) of 90/10 in forming the first electrode 12. Thus, and electrochromic device 10(H) was prepared in the following manner.

Formation of First Electrode and Measurement of Light Transmittance

On a 30-mm-square region and a lead portion of the first substrate 11 (i.e., a 40-mm-square glass substrate having a thickness of 0.7 mm), the first electrode 12 including indium tin oxide was formed by sputtering. The sputtering target was a mixture of $In_2O_3$ and $SnO_2$ with the mass ratio ($In_2O_3/SnO_2$) of 90/10. The electrode pattern was formed with a metal mask. The substrate was not heated during formation of the electrode film, but heated to 150° C. for 8 hours after formation of the electrode film. The sputtering power was set to 6.5 kW. The target film thickness was set to 110 nm. The sheet resistance was 60Ω. The sheet resistance was measured by a low resistivity meter LORESTA-AX (product of Mitsubishi Chemical Analytech Co., Ltd.).

The resulting first electrode 12 had an infrared light transmittance of 63% at a wavelength of 1,500 nm when measured in the same manner as in Example 1.

The light transmittance was measured by a UV/Vis/NIR Spectrophotometer V-670 (product of JASCO Corporation).

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. An electrochromic device comprising:
a first substrate;
a first electrode on the first substrate;
a second substrate;
a second electrode on the second substrate facing the first electrode;
an electrochromic layer in contact with the first electrode;
an anti-deterioration layer in contact with the second electrode facing the first electrode; and
an electrolyte layer in contact with both the electrochromic layer and the anti-deterioration layer,
wherein at least one of the first electrode and the second electrode includes an oxide material including an indium oxide represented by $In_2O_3$, and has an infrared light transmittance of 70% or more at a wavelength of 1.500 nm, and
wherein the electrochromic layer comprises as copolymerized units;
a triarylamine-containing radical polymerizable compound of formula (1) and a radical polymerizable compound other than the triarylamine-containing radical polymerizable compound:

$$A_n\text{-}B_m \qquad \text{Formula (1)}$$

where, when n is 2, m is 0, and when n is 1, m is 0 or 1; at least one of A and B has a radical polymerizable functional group; A is represented by the following formula (2), and at least one of $R_1$ to $R_{15}$ is bound to B; and B is represented by the following formula (3), and one of $R_{16}$ to $R_{21}$ is bound to A;

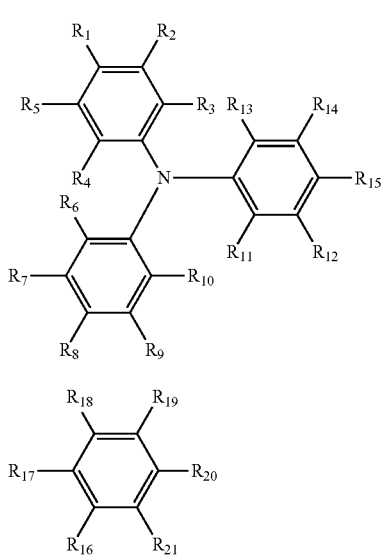

Formula (2)

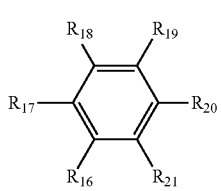

Formula (3)

where each of $R_1$ to $R_{21}$ independently represents a monovalent organic group, and at least one of the monovalent organic groups is a radical polymerizable functional group.

2. The electrochromic device of claim 1, wherein, when a redox reaction occurs in the electrochromic layer, the electrochromic device transits from a transparent state in which a light transmittance within a wavelength range of from 450 to 1,000 nm is 60% or more to another state in which a light transmittance within a wavelength range of from 750 nm to 1,000 nm is smaller than that in the transparent state.

3. The electrochromic device of claim 1,
wherein the at least one of the first electrode and the second electrode is formed with a sputtering target including the indium oxide represented by $In_2O_3$,
wherein, when the at least one of the first electrode and the second electrode is subjected to an X-ray diffraction measurement, no (440) plane peak is detected at around $2\theta \simeq 52$ (degrees), or an intensity ratio of a (440) plane peak detected at around $2\theta \simeq 52$ (degrees) to a main (222) plane peak detected at around $2\theta \simeq 32$ (degrees) is less than 0.14.

4. The electrochromic device of claim 1, wherein a content rate of the indium oxide represented by $In_2O_3$ in the oxide material is 95% by mass or more.

5. The electrochromic device of claim 1, wherein the triarylamine-containing radical polymerizable compound represented by the formula (1) includes a compound represented by the following formula (1-1):

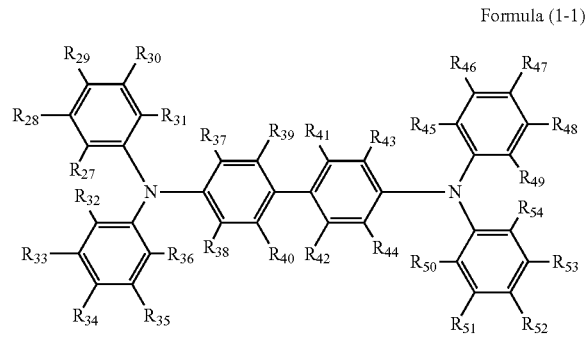

Formula (1-1)

where each of $R_{27}$ to $R_{54}$ independently represents a monovalent organic group; at least one of $R_{27}$ to $R_{54}$ is a radical polymerizable functional group; $R_{39}$ and $R_{41}$ may share bond connectivity to from a ring; and $R_{40}$ and $R_{42}$ may share bond connectivity to from a ring.

6. The electrochromic device of claim 1, wherein the anti-deterioration layer includes a dipyridine compound represented by the following formula (4):

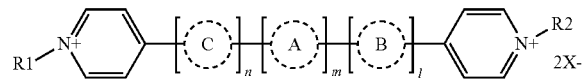

Formula (4)

where each of R1 and R2 independently represents a substituted or unsubstituted alkyl or aryl group having 1 to 8 carbon atoms; X represents a monovalent anion; each of n, m, and l independently represents 0, 1, or 2; and each of A, B, and C independently represents a substituted or unsubstituted alkyl, aryl, or heterocyclic group having 1 to 20 carbon atoms.

7. The electrochromic device of claim 1, wherein the anti-deterioration layer and the electrolyte layer are combined into an integrated layer.

8. The electrochromic device of claim 1, wherein the electrochromic device is a light-control glass device.

9. The electrochromic device according to claim 1, wherein the other radical polymerizable compound comprises at least one compound selected from the group consisting of a monofunctional radical polymerizable compound, a difunctional radical polymerizable compound, a tri- or more-functional radical polymerizable compound, a functional monomer and a radical polymerizable oligomer.

10. The electrochromic device according to claim 1, wherein the other radical polymerizable compound comprises a difunctional radical polymerizable compound.

11. The electrochromic device according to claim 10, wherein the difunctional radical polymerizable compound is one or more selected from the group consisting of 1,3-butanediol diacrylate, 1,4-butanediol diacrylate, 1,4-butanediol dimethacrylate, 1,6-hexanediol diacrylate, 1,6-hexanediol dimethacrylate, diethylene glycol diacrylate, polyethylene glycol diacrylate, neopentyl glycol diacrylate, EO-modified bisphenol A diacrylate, EO-modified bisphenol F diacrylate, and neopentyl glycol diacrylate.

12. The electrochromic device according to claim 1, wherein the other radical polymerizable compound comprises a tri- or more-functional radical polymerizable compound.

13. The electrochromic device according to claim 10, wherein the tri- or more functional radical polymerizable compound is one or more selected from the group consisting of trimethylolpropane triacrylate (TMPTA), trimethylolpropane trimethacrylate, EO-modified trimethylolpropane triacrylate, PO-modified trimethylolpropane triacrylate, caprolactone-modified trimethylolpropane triacrylate, HPA-modified trimethylolpropane trimethacrylate, pentaerythritol triacrylate, pentaerythritol tetraacrylate (PETTA), glycerol triacrylate, ECH-modified glycerol triacrylate, EO-modified glycerol triacrylate, PO-modified glycerol triacrylate, tris(acryloxyethyl) isocyanurate, dipentaerythritol hexaacrylate (DPHA), caprolactone-modified dipentaerythritol hexaacrylate, dipentaerythritol hydroxypentaacrylate, alkyl-modified dipentaerythritol pentaacrylate, alkyl-modified dipentaerythritol tetraacrylate, alkyl-modified dipentaerythritol triacrylate, dimethylolpropane tetraacrylate (DTMPTA), pentaerythritol ethoxytetraacrylate, EO-modified phosphoric triacrylate, and 2,2,5,5-tetrahydroxymethylcyclopentanone tetraacrylate.

14. The electrochromic device according to claim 1, wherein the radical polymerizable compound of formula (I) comprises at least two radical polymerizable functional groups selected from an acryloloyloxy group and a methacryloyloxy group.

* * * * *